(12) United States Patent
Karapetian et al.

(10) Patent No.: US 11,142,303 B2
(45) Date of Patent: Oct. 12, 2021

(54) AIRCRAFT SUBASSEMBLY, HAVING MAIN-LANDING-GEAR ASSEMBLY AND SPONSON, HOUSING MAIN-LANDING-GEAR ASSEMBLY

(71) Applicant: The Boeing Company, Chicago, IL (US)

(72) Inventors: Michael S. Karapetian, Huntington Beach, CA (US); John Joseph Brown, Costa Mesa, CA (US); James K. Pennell, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 16/720,807

(22) Filed: Dec. 19, 2019

(65) Prior Publication Data
US 2021/0188424 A1 Jun. 24, 2021

(51) Int. Cl.
*B64C 25/12* (2006.01)
*B64C 25/16* (2006.01)
*B64C 1/22* (2006.01)
*B64C 25/18* (2006.01)

(52) U.S. Cl.
CPC ............... *B64C 25/12* (2013.01); *B64C 1/22* (2013.01); *B64C 25/16* (2013.01); *B64C 25/18* (2013.01); *B64C 2025/125* (2013.01)

(58) Field of Classification Search
CPC .... B64C 25/12; B64C 25/16; B64C 2025/125
See application file for complete search history.

(56) References Cited

U.S. PATENT DOCUMENTS 2,362,919 A * 11/1944 Wendell .................. B64C 25/16
244/102 R
8,038,096 B2 10/2011 White
8,490,914 B2 7/2013 Chow et al.
(Continued)

FOREIGN PATENT DOCUMENTS

DE 10207767 A1 9/2003

OTHER PUBLICATIONS https://www.atr-aircraft.com/our-aircraft/atr-72-600f-freighter/.*
(Continued)

*Primary Examiner* — Richard G Davis
(74) *Attorney, Agent, or Firm* — Kwan & Olynick LLP

(57) ABSTRACT

An aircraft subassembly comprises a fuselage structure, comprising a first side and a second side. The aircraft subassembly further comprises a main-landing-gear system, having a single pair of wheels. The main-landing-gear system additionally comprises a sponson, connected to and extending outward from the fuselage structure. The sponson comprises a central portion and a first main-landing-gear door that is moveable relative to the central portion between, inclusively, a closed position and an open position. The sponson further comprises a second main-landing-gear door that is moveable relative to the central portion between, inclusively, a closed position and an open position. The main-landing-gear system further comprises a first main-landing-gear assembly, connected to the first wheel and a second main-landing-gear assembly, connected to the second wheel.

20 Claims, 19 Drawing Sheets

(56) References Cited

U.S. PATENT DOCUMENTS

| | | | |
|---|---|---|---|
| 8,523,107 B2* | 9/2013 | Salmon | B64C 25/12 244/102 A |
| 2003/0164424 A1* | 9/2003 | Smith | B64C 35/008 244/105 |
| 2010/0237188 A1 | 9/2010 | Sagne et al. | |
| 2012/0160968 A1 | 6/2012 | Barmichev et al. | |
| 2016/0214720 A1* | 7/2016 | Hara | F16D 65/847 |

OTHER PUBLICATIONS https://en.wikipedia.org/wiki/ATR_72.* https://en.wikipedia.org/wiki/Let_L-410_Turbolet.*

Antonov AN-178 Medium Transport Aircraft available at https://www.antonov.com/en/an-178, last visited Dec. 19, 2019, 7 pages.

European Application Serial No. 20200792.8, Search Report dated Mar. 26, 2021, 8 pgs.

Herzog, Julian; Datei: RUAG Aviation Do 228 NG D-CNEU 2.jpg—Wikipedia; Feb. 22, 2013, pp. 1-3; Retrieved from the Internet: URL: https://de.wikipedia.org/wiki/Datei:RUAG_Aviation_Do_228_D-CNEU_2.jpg.

RUAG: Dornier 228 Advanced Commuter (AC) Facts & Figures, Jun. 30, 2017, pp. 1-32; Retrieved from the Internet: URL: https://ruag-inernational.picturepark.com/v/SQrnZwhjP.

RUAG: Issue 4 Magazine for the Dornier 228 Community, Sep. 4, 2019, pp. 1-44; Retrieved from the Internet: URL: https://www.lovedornier228.com/app/uploads/2019/10/LoveDornier228_Issue_4_web.pdf.

RUAG: Dornier 228 Multirole (MR) Facts & Figures 2, Facts and Figures Operations Support Contents, Mar. 31, 2017, pp. 1-52; Retrieved from the Internet: URL: https://ruag-international.picturepark.com/v/oikLF25E.

* cited by examiner

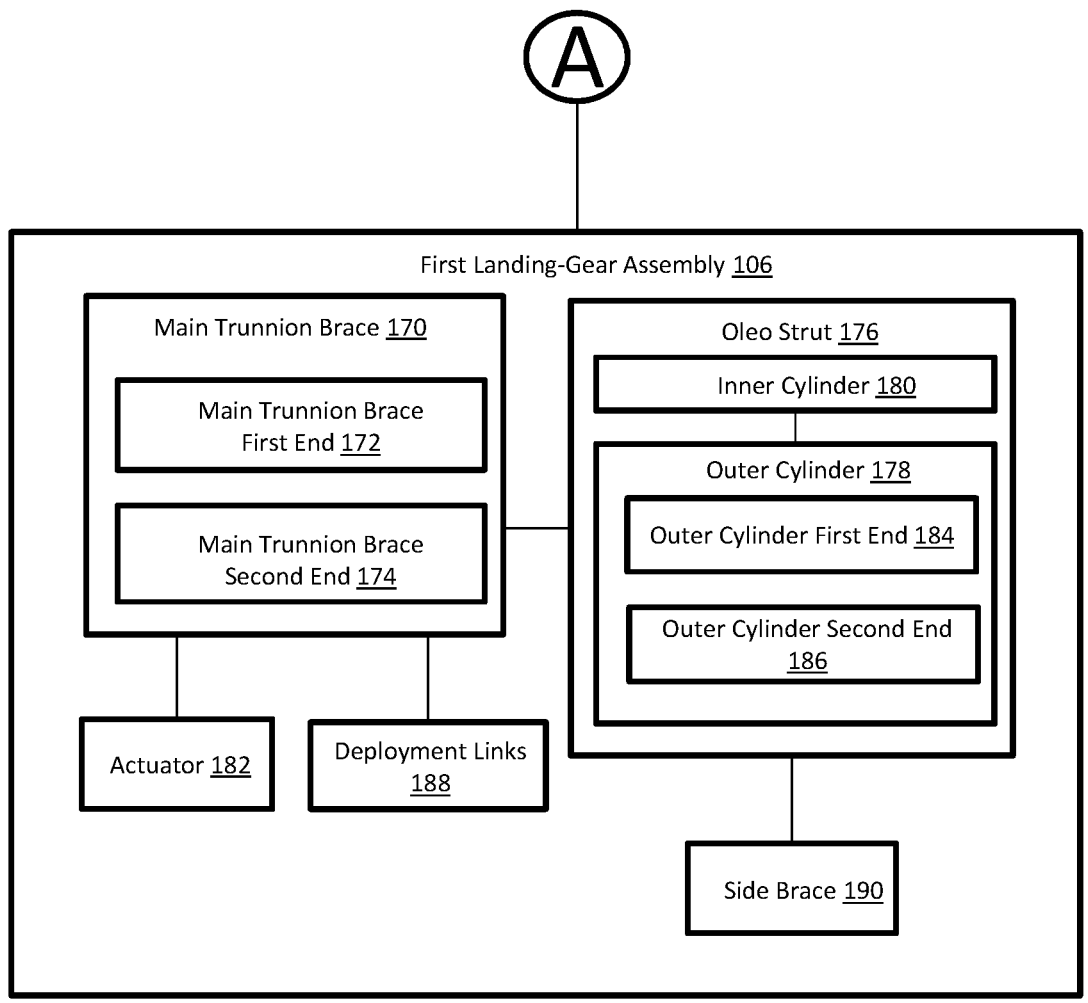
FIG. 1B (Continued From FIG. 1A)

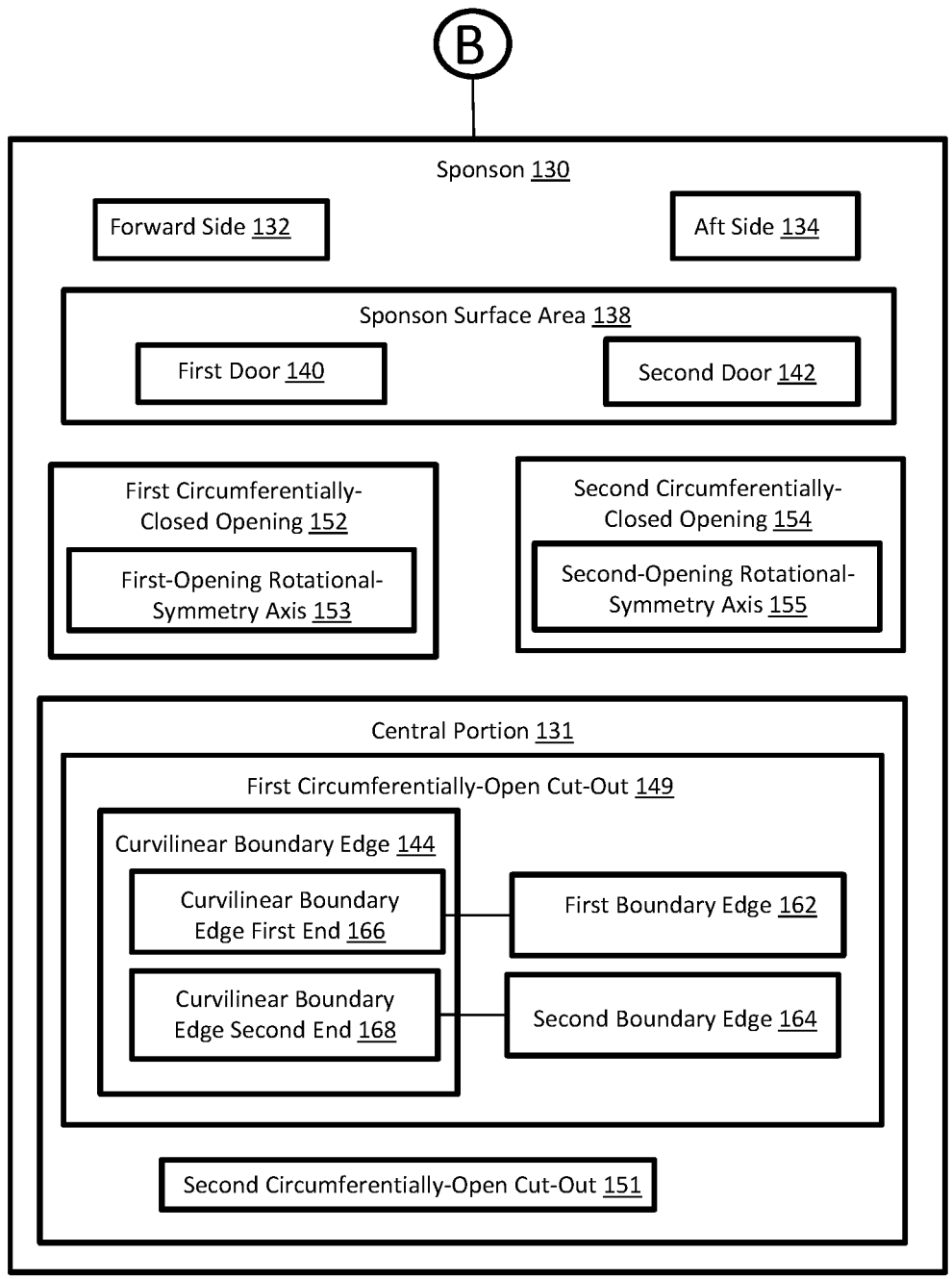
FIG. 1C (Continued From FIG. 1A)

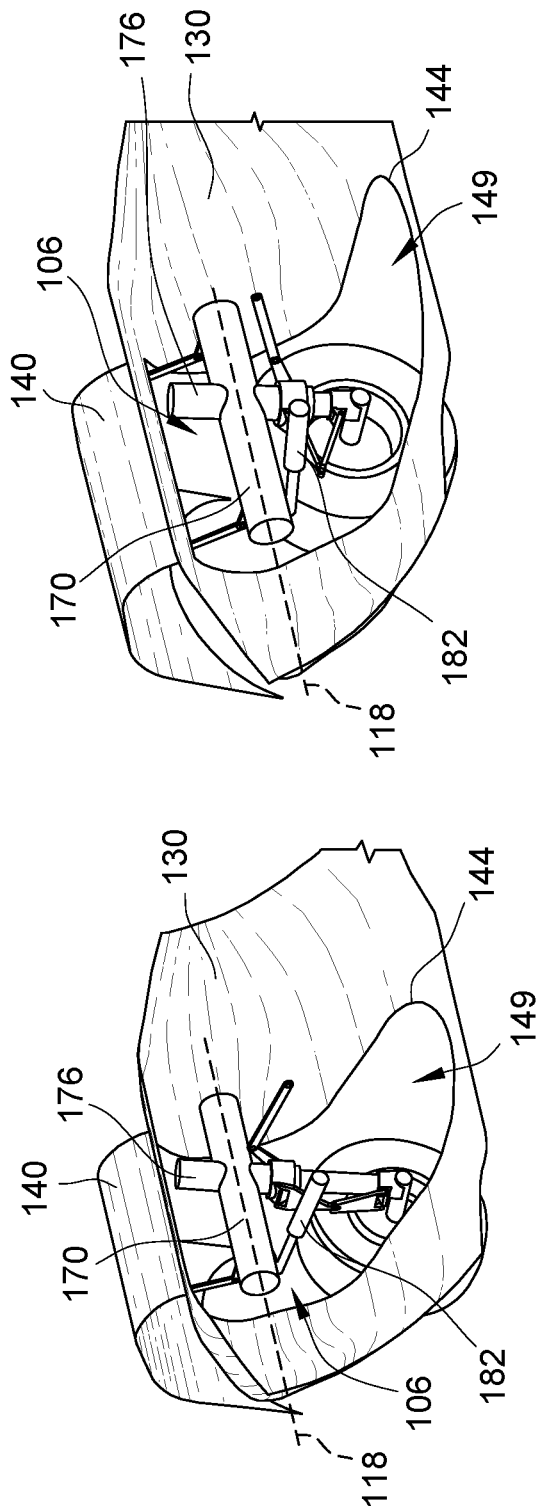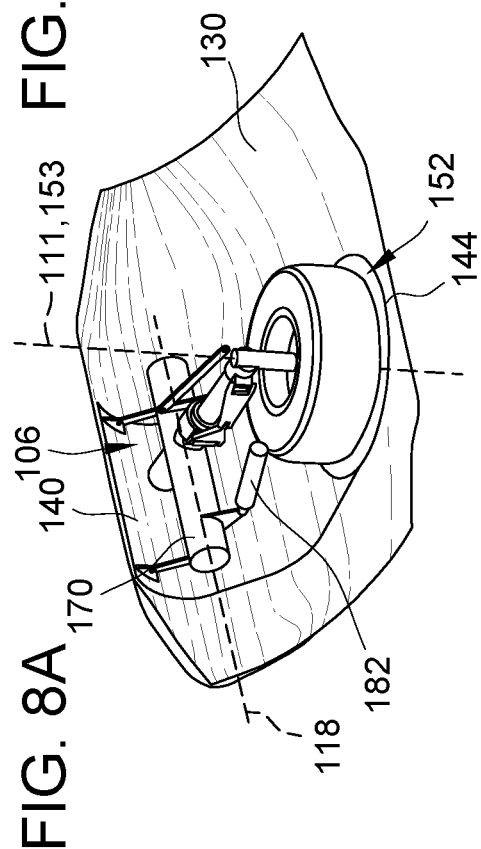
FIG. 8A  FIG. 8B  FIG. 8C

AIRCRAFT SUBASSEMBLY, HAVING MAIN-LANDING-GEAR ASSEMBLY AND SPONSON, HOUSING MAIN-LANDING-GEAR ASSEMBLY

TECHNICAL FIELD

The present disclosure relates to an aircraft subassembly having a main-landing-gear assembly and a sponson, housing the main-landing-gear assembly.

BACKGROUND

At least some known aircraft are designed with a passenger cabin, located above a cargo bay. Many such aircraft have a low-wing configuration with the main landing gear positioned primarily in a fuselage bay below the passenger cabin. However, in a cargo transport aircraft, it is desirable to maximize the amount of available cargo space. Accordingly, the passenger cabin is eliminated and the cargo bay floor is located as close to the ground as possible. As a consequence, the space, available within the fuselage for integration of main landing gear is highly restricted.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is an aircraft subassembly that comprises a fuselage structure. The fuselage structure comprises a first side, which comprises a first plurality of frame members. The fuselage structure also comprises a second side, which comprises a second plurality of frame members. The aircraft subassembly additionally comprises a pair of wings, attached to the fuselage structure. The aircraft subassembly further comprises a main-landing-gear system, having a single pair of wheels. The single pair of wheels consists of a first wheel, having a first-wheel azimuthal-rotational-symmetry axis and a first-wheel mid-plane that is perpendicular to the first-wheel azimuthal-rotational-symmetry axis, and a second wheel, having a second-wheel azimuthal-rotational-symmetry axis and a second-wheel mid-plane that is perpendicular to the second-wheel azimuthal-rotational-symmetry axis. The main-landing-gear system additionally comprises a sponson, connected to and extending outward from the fuselage structure. The sponson comprises a central portion and a first main-landing-gear door that is moveable relative to the central portion between, inclusively, a closed position and an open position. The sponson further comprises a second main-landing-gear door that is moveable relative to the central portion between, inclusively, a closed position and an open position. The main-landing-gear system also comprises a first main-landing-gear assembly, connected to the first wheel, and a second main-landing-gear assembly, connected to the second wheel.

Main-landing-gear system includes only two wheels in the exemplary configuration, which reduces the weight of aircraft subassembly compared to other similarly sized cargo aircraft and still accommodates a comparable take-off weight. That is, main-landing-gear system allows aircraft subassembly to carry a similar amount of cargo weight as other, larger aircraft that include larger landing gear assembly assemblies. As such, aircraft subassembly described herein has reduced operational costs because of requiring less fuel to transport a comparable amount of cargo.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIGS. 8A, 8B, and 8C are schematic, perspective views of one main-landing-gear assembly of FIG. 3 in the extended configuration, an extended/compressed configuration, and the retracted configuration, according to one or more examples of the subject matter, disclosed herein;

DETAILED DESCRIPTION

Figures 1A, 1B, 1C:
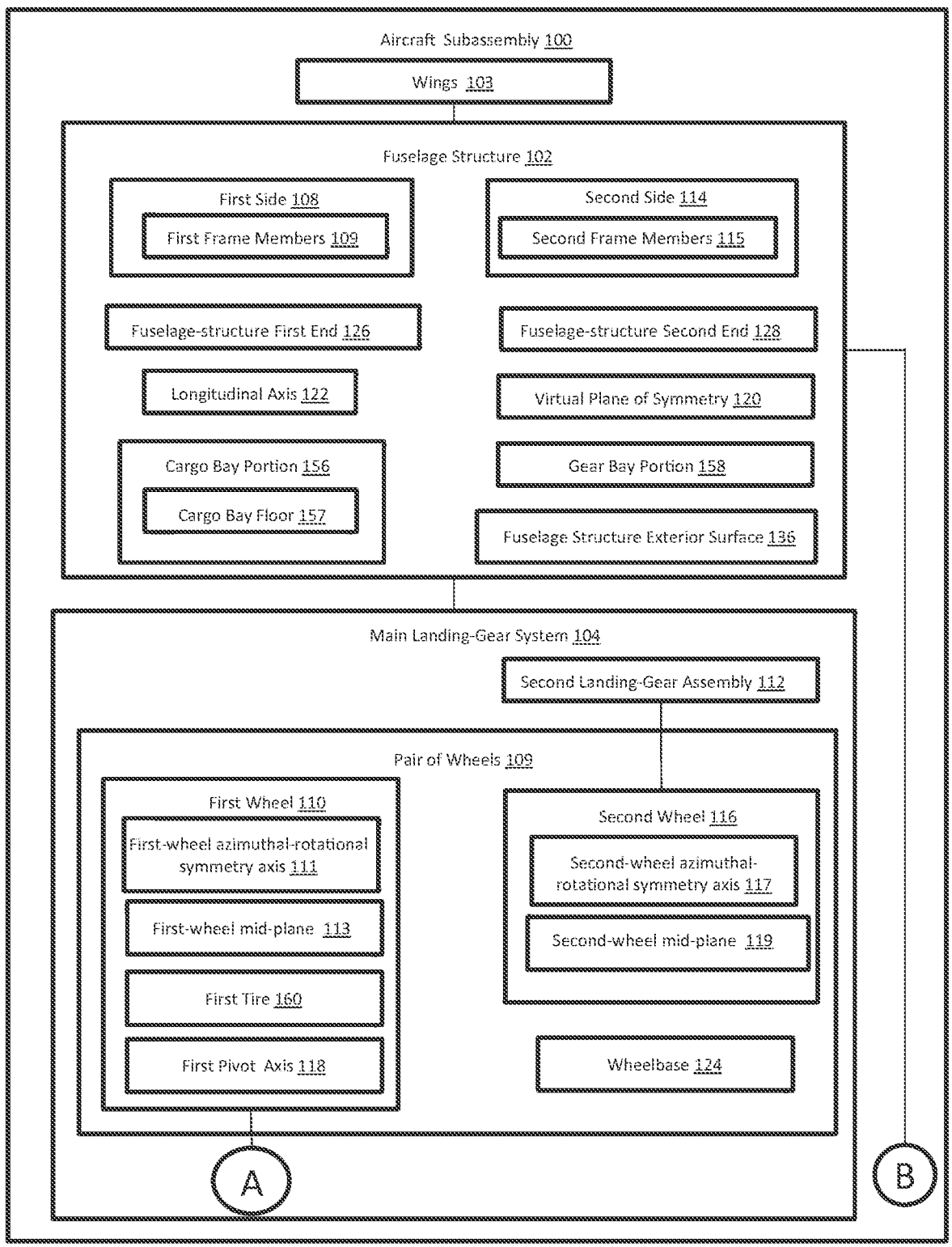
FIGS. 1A, 1B, and 1C, collectively, are a block diagram of an aircraft subassembly, according to one or more examples of the subject matter, disclosed herein.

In FIGS. 1A, 1B, and 1C, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIGS. 1A, 1B, and 1C may be combined in various ways without the need to include other features, described in FIGS. 1A, 1B, and 1C, other drawing figures, and/or the accompanying disclosure, even though such combination or combinations are not explicitly illustrated herein. Similarly, additional features not limited to the examples presented, may be combined with some or all of the features shown and described herein.

Figure 16:
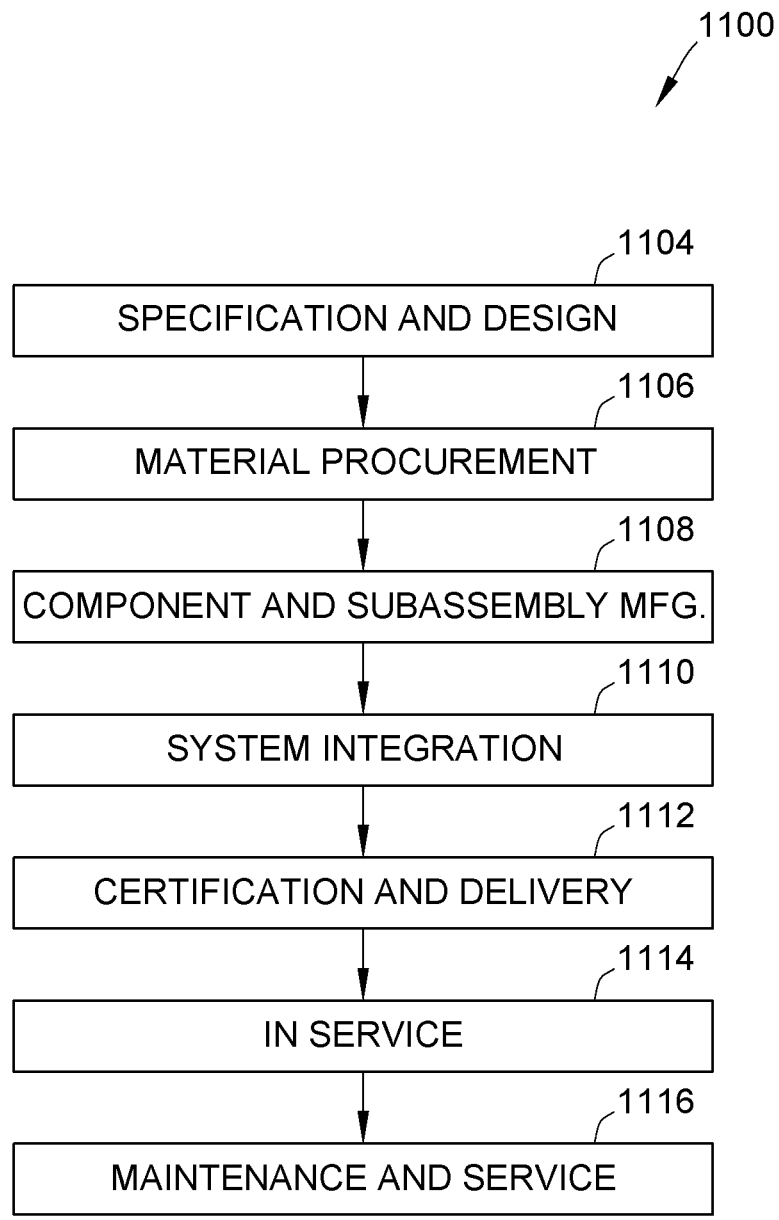
FIG. 16 is a block diagram of aircraft production and service methodology.
Figure 17:
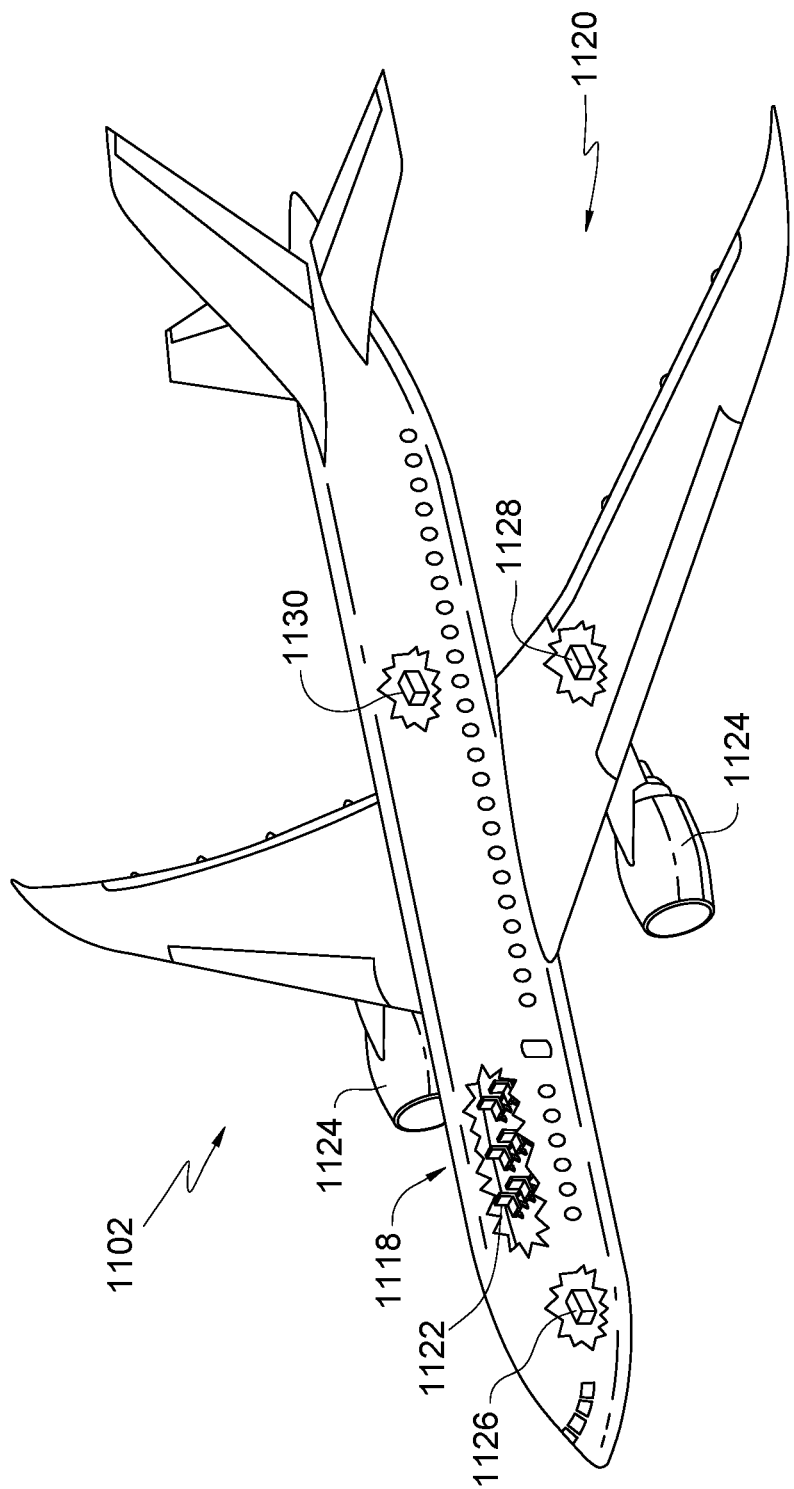
FIG. 17 is a schematic illustration of an aircraft.

In FIGS. 16 and 17, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 16 and 17 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIGS. 1A, 1B, and 1C and particularly to, e.g., FIGS. 3-15 for illustrative purposes only and not by way of limitation, aircraft subassembly 100 is disclosed. Aircraft subassembly 100 comprises fuselage structure 102, comprising first side 108, which comprises first plurality of frame members 109. Fuselage structure 102 further comprises second side 114, which comprises second plurality of frame members 115. Aircraft subassembly 100 also comprises pair of wings 103, attached to fuselage structure 102. Aircraft subassembly 100 additionally comprises main-landing-gear system 104, having single pair of wheels 107. Single pair of wheels 107 consists of first wheel 110, having first-wheel azimuthal-rotational-symmetry axis 111 and first-wheel mid-plane 113 that is perpendicular to first-wheel azimuthal-rotational-symmetry axis 111, and second wheel 116, having second-wheel azimuthal-rotational-symmetry axis 117 and second-wheel mid-plane 119 that is perpendicular to second-wheel azimuthal-rotational-symmetry axis 117. Main-landing-gear system 104 additionally comprises sponson 130, connected to and extending outward from fuselage structure 102. Sponson 130 comprises central portion 131 and first main-landing-gear door 140 that is moveable relative to central portion 131 between, inclusively, a closed position and an open position. Sponson 130 further comprises second main-landing-gear door 142 that is moveable relative to central portion 131 between, inclusively, a closed position and an open position. Main-landing-gear system 104 also comprises first main-landing-gear assembly 106, connected to first wheel 110, and second main-landing-gear assembly 112, connected to second wheel 116. The preceding content of this paragraph characterizes example 1 of the subject matter, disclosed herein.

Main-landing-gear system 104 includes only two wheels in the exemplary configuration, which reduces the weight of aircraft subassembly 100 compared to other similarly sized cargo aircraft and still accommodates a comparable take-off weight. That is, main-landing-gear system 104 allows aircraft subassembly 100 to carry a similar amount of cargo weight as other, larger aircraft that include larger landing gear assembly assemblies. As such, aircraft subassembly 100 described herein has reduced operational costs because of requiring less fuel to transport a comparable amount of cargo.

Figure 5:
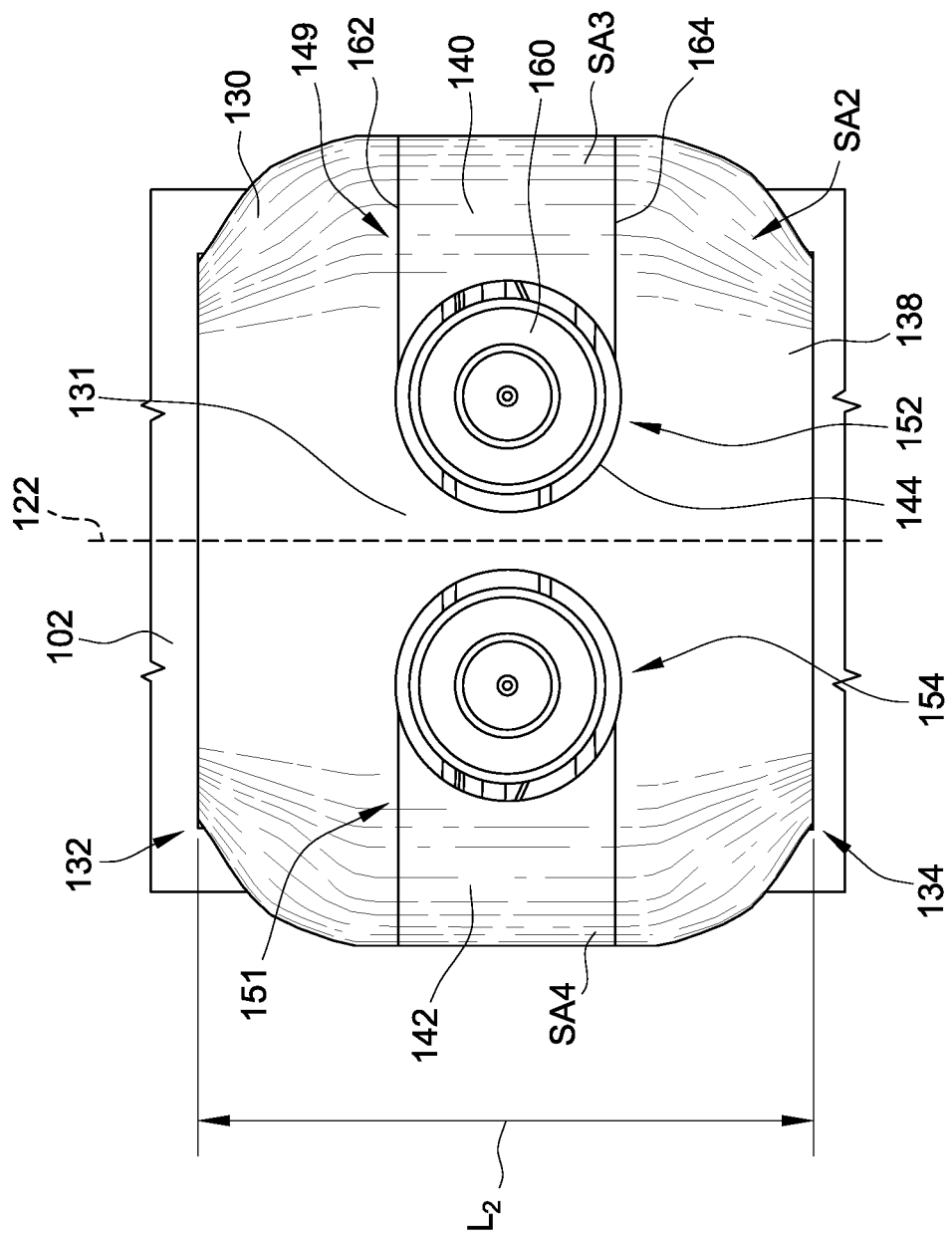
FIG. 5 is a schematic, bottom view of the sponson of FIG. 4, according to one or more examples of the subject matter, disclosed herein.
Figure 10A:
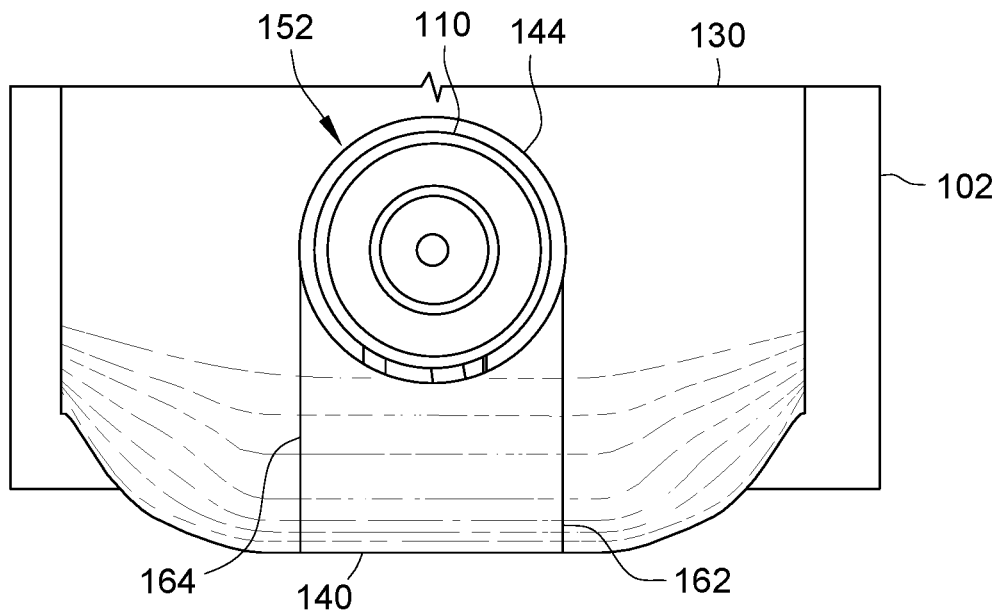
FIGS. 10A and 10B are schematic, bottom views of the sponson of FIG. 5, illustrating the main-landing-gear assembly in the retracted position and in the extended position, according to one or more examples of the subject matter, disclosed herein.
Figure 10B:
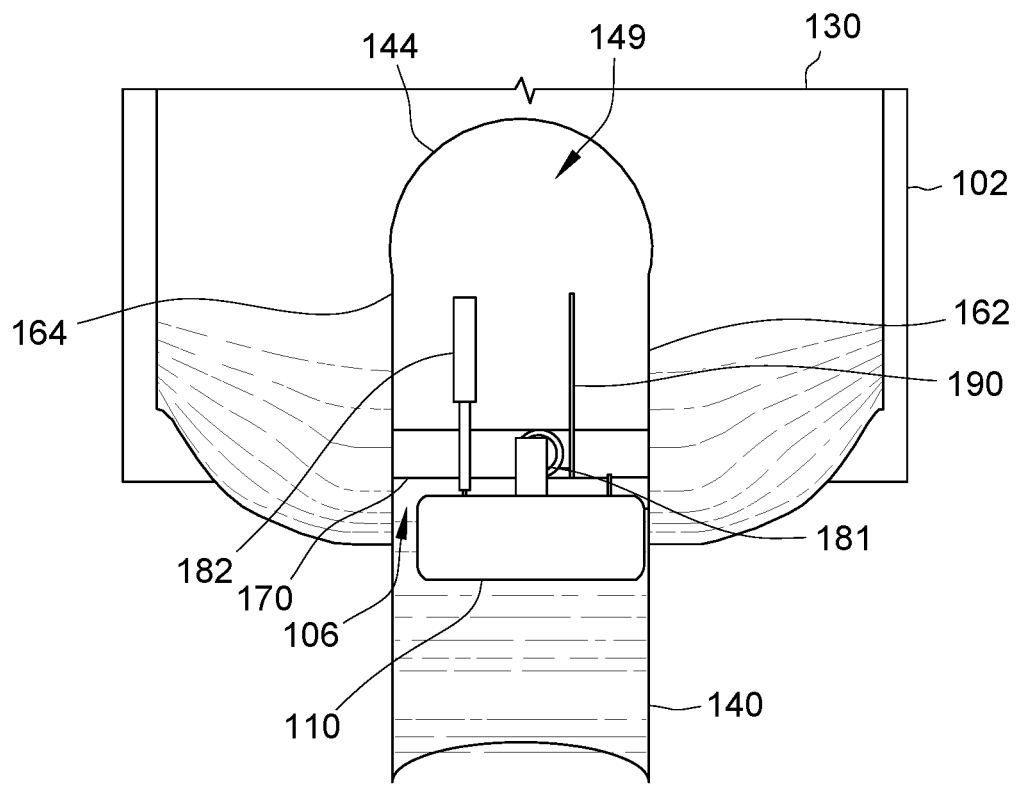
Figure 11A:
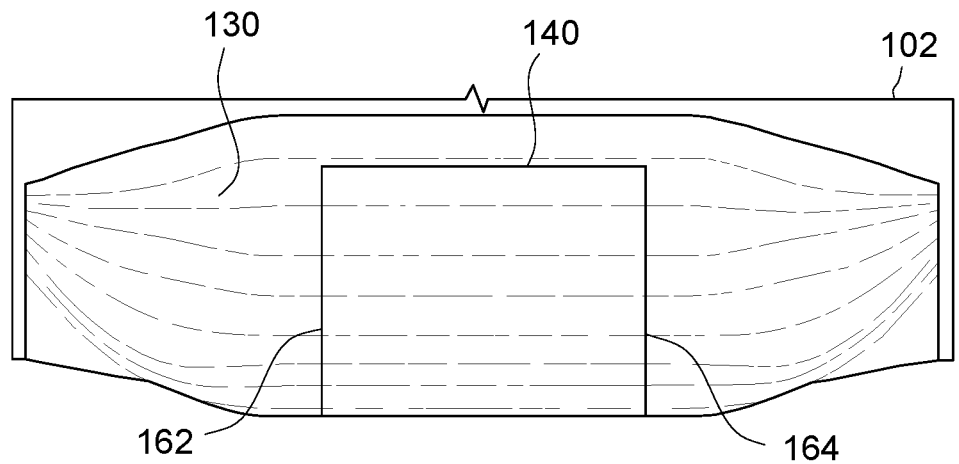
FIGS. 11A and 11B are schematic, side views of the sponson of FIG. 5, illustrating the main-landing-gear assembly in the retracted position and in the extended position, according to one or more examples of the subject matter, disclosed herein.
Figure 11B:
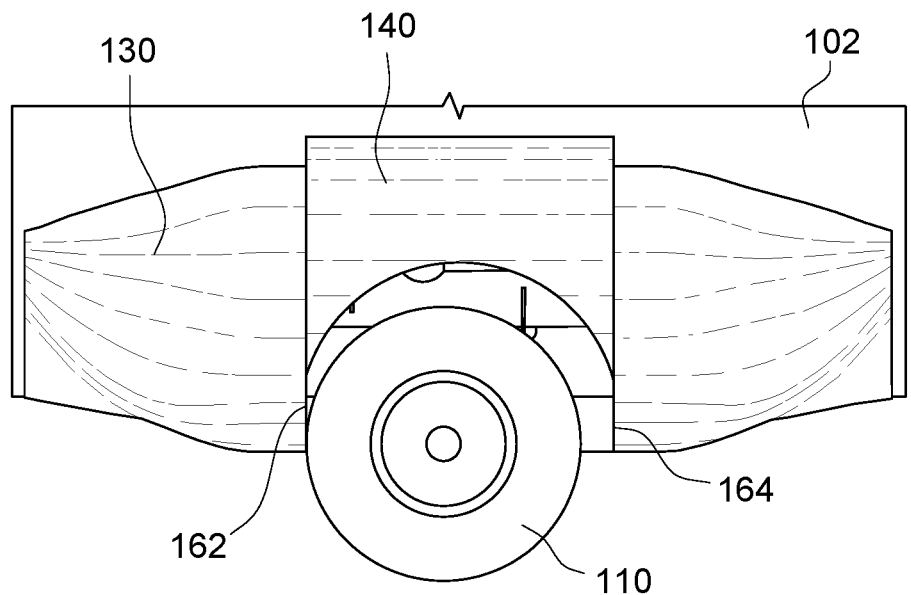
Figure 12A:
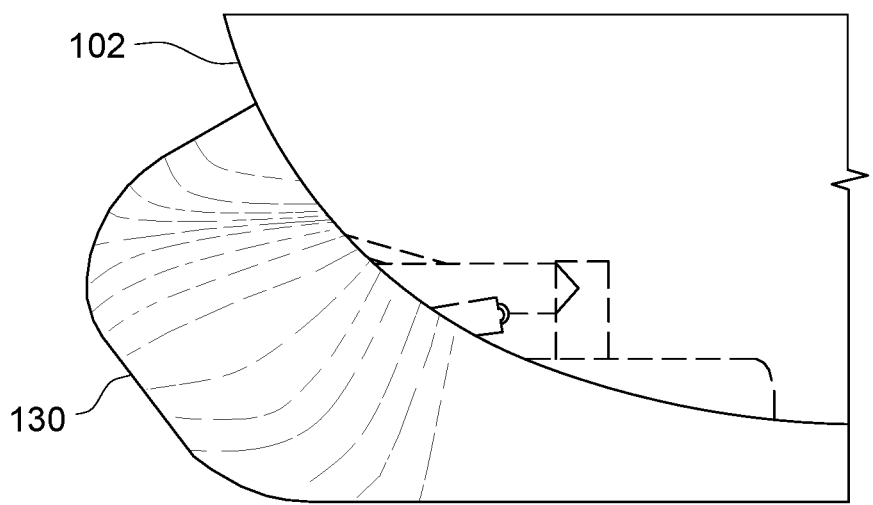
FIGS. 12A and 12B are schematic, front views of the sponson of FIG. 5, illustrating the main-landing-gear assembly in the retracted position and in the extended position, according to one or more examples of the subject matter, disclosed herein.
Figure 12B:
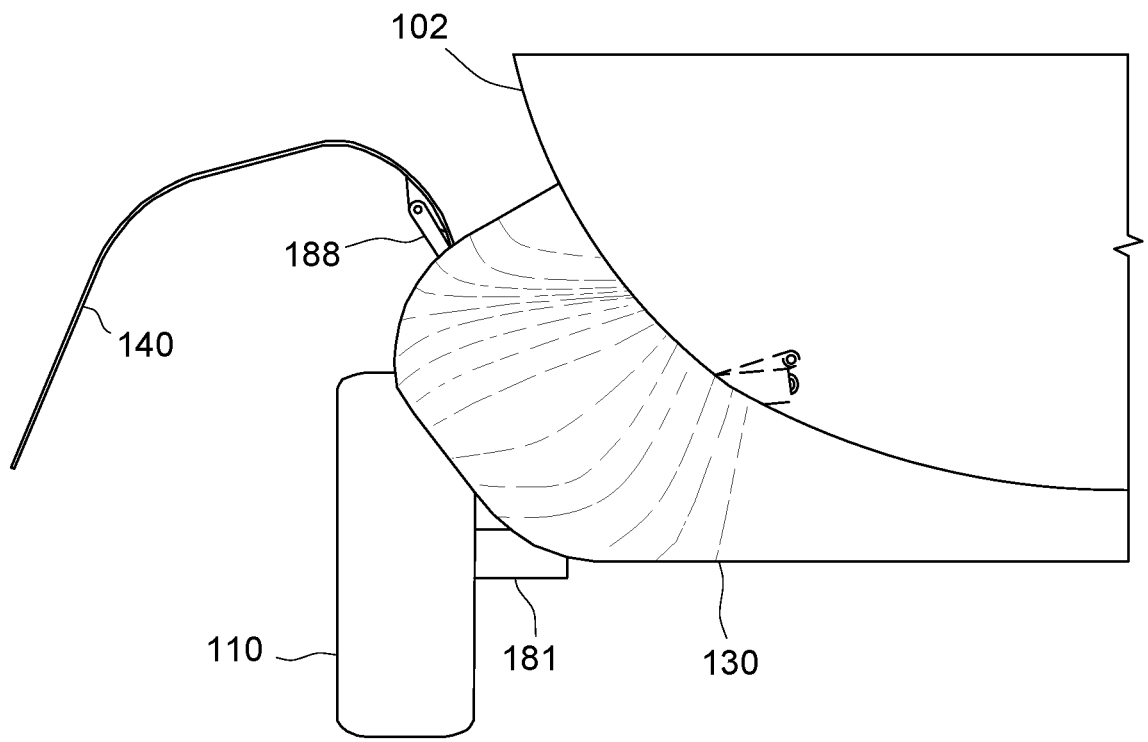

Referring generally to FIGS. 1A, 1B, and 1C and particularly to, e.g., FIGS. 5, 8B, and 10B for illustrative purposes only and not by way of limitation, aircraft subassembly 100 further comprises virtual plane of symmetry 120, equidistant from first side 108 of fuselage structure 102 and from second side 114 of fuselage structure 102. Central portion 131 of sponson 130 comprises first circumferentially open cut-out 149 and second circumferentially open cut-out 151. Virtual plane of symmetry 120 passes between first circumferentially open cut-out 149 and second circumferentially open cut-out 151. The preceding content of this paragraph characterizes example 2 of the subject matter, disclosed herein, where example 2 also encompasses example 1, above.

Positioning first circumferentially open cut-out 149 and second circumferentially open cut-out 151 on opposite sides equidistant from virtual plane of symmetry 120 balances aircraft subassembly 100 and makes manufacturing easier and less costly due to the symmetrical configuration.

Referring generally to FIGS. 1A, 1B, and 1C and particularly to, e.g., FIGS. 8B and 10B for illustrative purposes only and not by way of limitation, first circumferentially open cut-out 149 is non-circular. The preceding content of this paragraph characterizes example 3 of the subject matter, disclosed herein, where example 3 also encompasses example 2, above.

First circumferentially open cut-out 149 is non-circular to account for the shape of first main-landing-gear door 140.

Figure 6:
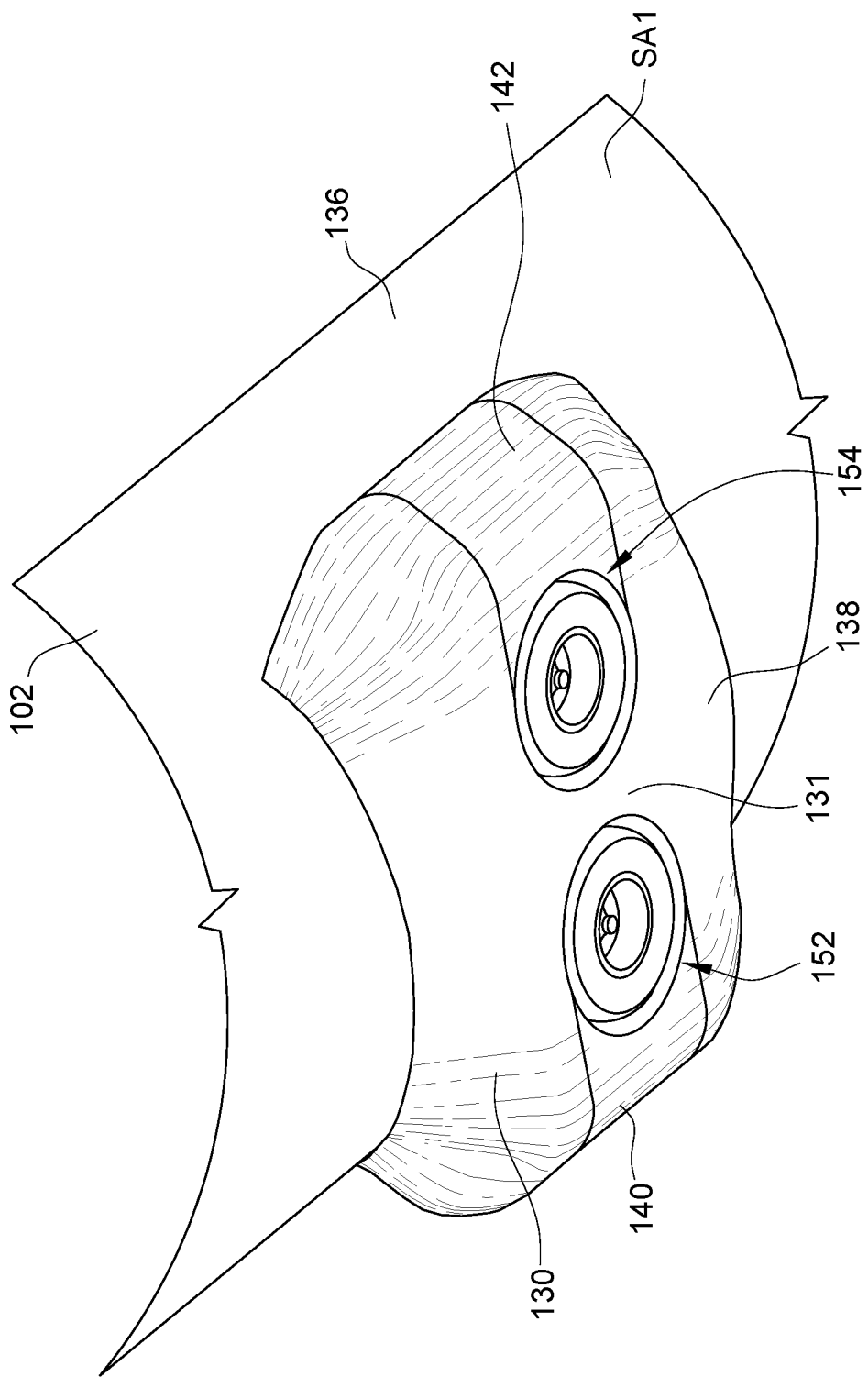
FIG. 6 is a schematic, perspective view of the sponson of FIG. 4, according to one or more examples of the subject matter, disclosed herein.

Referring generally to FIGS. 1A, 1B, and 1C and particularly to, e.g., FIGS. 5 and 6 for illustrative purposes only and not by way of limitation, fuselage structure 102 has fuselage exterior surface 136, having fuselage surface area SA1, and sponson 130 has sponson exterior surface 138, having sponson surface area SA2. Sponson surface area SA2 is 10% to 15% of fuselage surface area SA1. The preceding content of this paragraph characterizes example 4 of the subject matter, disclosed herein, where example 4 also encompasses example 3, above.

The relatively low sponson surface area SA2 to fuselage surface area SA1 ratio is associated with sponson 130 that has a relatively small size. In such a configuration, sponson 130 has a low drag coefficient on aircraft subassembly 100 as aircraft subassembly 100 flies through the air. As used herein, the term "drag coefficient" is defined as is a dimensionless quantity that is used to quantify the drag or resistance of an object in a fluid environment, such as air. Reducing the drag coefficient of sponson 130 improves the performance of aircraft subassembly 100 as it pertains to speed and fuel efficiency of the aircraft, based on aircraft subassembly 100. Specifically, a low drag coefficient enables an increased maximum speed and an increased fuel efficiency of the aircraft, associated with aircraft subassembly 100.

Referring generally to FIGS. 1A, 1B, and 1C and particularly to, e.g., FIGS. 5 and 6 for illustrative purposes only and not by way of limitation, sponson surface area SA2 is 11% to 13% of fuselage surface area SA1. The preceding content of this paragraph characterizes example 4 of the subject matter, disclosed herein, where example 5 also encompasses example 4, above.

As described herein, a smaller sponson surface area SA2 to fuselage surface area SA1 ratio is associated with a relatively low drag coefficient of sponson 130. Reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100.

Referring generally to FIGS. 1A, 1B, and 1C and particularly to, e.g., FIGS. 5 and 6 for illustrative purposes only and not by way of limitation, sponson surface area SA2 is 12% of fuselage surface area SA1. The preceding content of this paragraph characterizes example 6 of the subject matter, disclosed herein, where example 6 also encompasses example 5, above.

As described herein, a smaller sponson surface area SA2 to fuselage surface area SA1 ratio is associated with a relatively low drag coefficient of sponson 130. Reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100.

Referring generally to FIGS. 1A, 1B, and 1C and particularly to, e.g., FIGS. 5 and 6 for illustrative purposes only and not by way of limitation, first main-landing-gear door 140 has first-main-landing-gear-door surface area SA3, and second main-landing-gear door 142 has second-main-landing-gear-door surface area SA4. First-main-landing-gear-door surface area SA3 and second-main-landing-gear-door surface area SA4 form a portion of sponson surface area SA2. The preceding content of this paragraph characterizes example 7 of the subject matter, disclosed herein, where example 7 also encompasses any one of examples 4 to 6, above.

The exterior surfaces of first main-landing-gear door 140 and second main-landing-gear door 142 are flush with the exterior surface of central portion 131 of sponson 130 and are also exposed to the exterior environment when the aircraft, based on aircraft subassembly 100, is in flight. As such, first main-landing-gear door 140 and second main-landing-gear door 142 form part of sponson 130 to reduce the drag coefficient of sponson 130 and to increase the fuel efficiency of the aircraft, based on aircraft subassembly 100.

Figure 3:
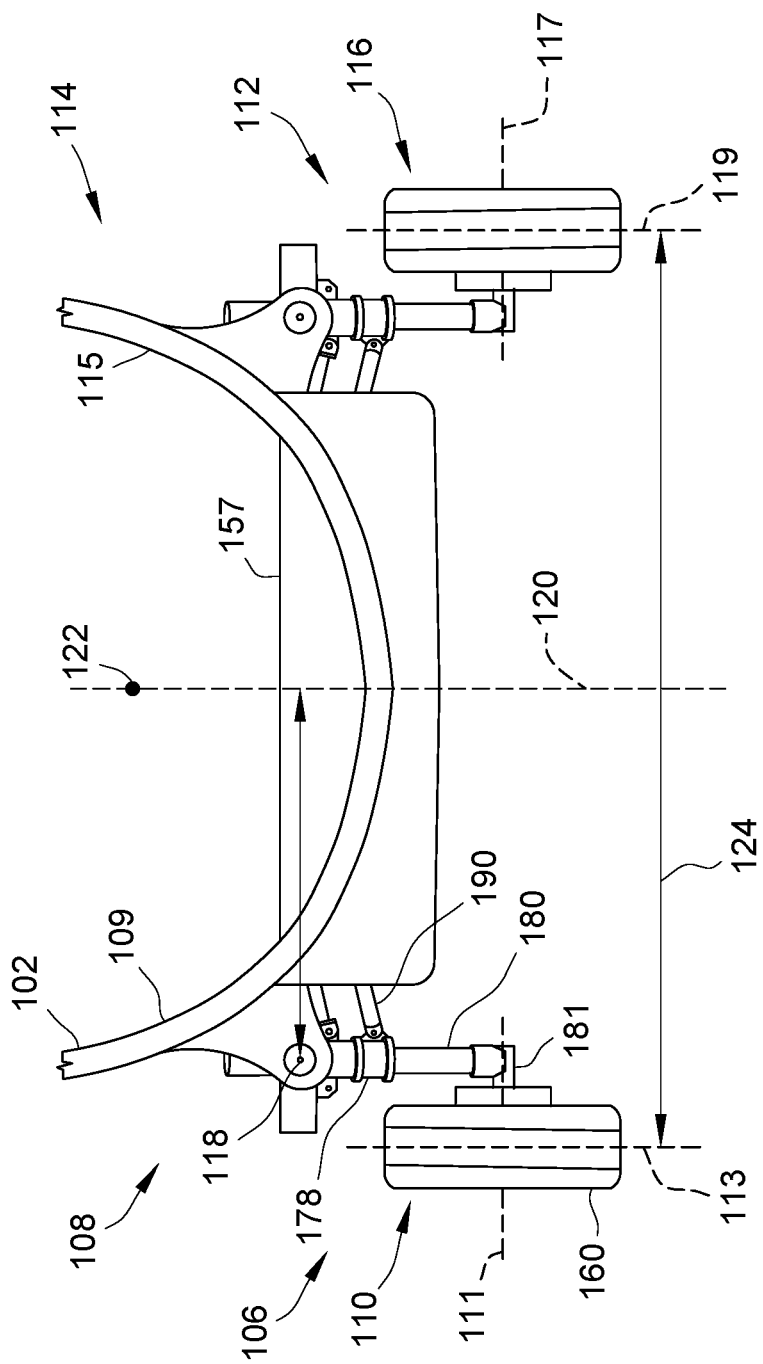
FIG. 3 is a schematic, partial cut-away view of the aircraft subassembly of FIGS. 1A, 1B, and 1C illustrating a fuselage structure and a pair of main-landing-gear assemblies in an extended position, according to one or more examples of the subject matter, disclosed herein.
Figure 4:
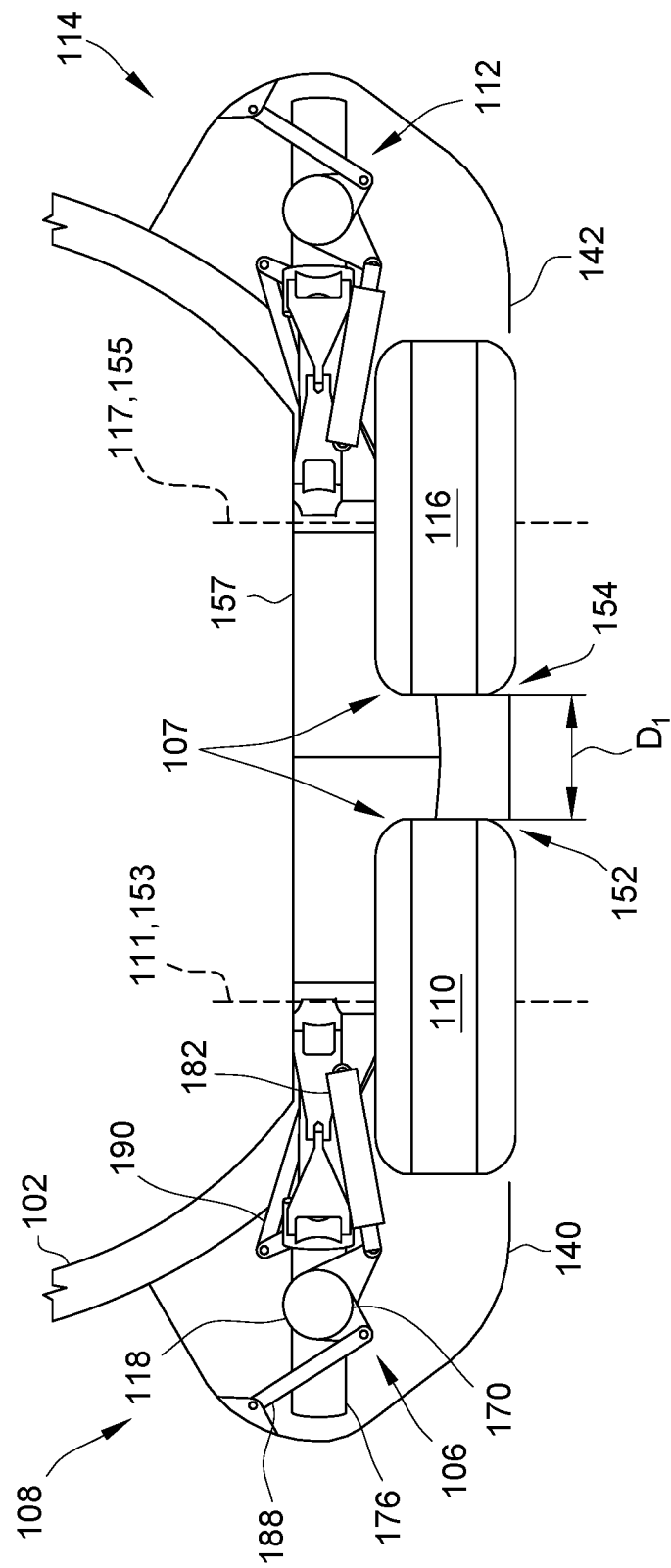
FIG. 4 is a schematic, partial cut-away view of the aircraft subassembly of FIGS. 1A, 1B, and 1C illustrating the pair of main-landing-gear assemblies in a retracted position within a sponson, according to one or more examples of the subject matter, disclosed herein.

Referring generally to FIGS. 1A, 1B, and 1C and particularly to, e.g., FIGS. 3-5 for illustrative purposes only and not by way of limitation, first main-landing-gear door 140 and central portion 131 of sponson 130 collectively form first circumferentially closed opening 152 when first main-landing-gear door 140 is in the closed position. First circumferentially closed opening 152 has first-opening rotational-symmetry axis 153 that is perpendicular to a virtual plane, in which a projection of first circumferentially closed opening 152 has a maximum area. Second main-landinggear door 142 and central portion 131 of sponson 130 collectively form second circumferentially closed opening 154 when second main-landing-gear door 142 is in the closed position. Second circumferentially closed opening 154 is circumferentially closed and has second-opening symmetry axis 155 that is perpendicular to a virtual plane, in which a projection of second circumferentially closed opening 154 has a maximum area. First main-landing-gear assembly 106 is connected to at least one of first plurality of frame members 109. First main-landing-gear assembly 106 is also pivotable relative to at least one of first plurality of frame members 109 and is selectively moveable between, inclusively, a retracted position and an extended position. When first main-landing-gear assembly 106 is in the retracted position, first main-landing-gear door 140 is in the closed position, and first-wheel azimuthal-rotational-symmetry axis 111 is collinear with first-opening rotational-symmetry axis 153. When first main-landing-gear assembly 106 is in the extended position, first main-landing-gear door 140 is in the open position, and first-wheel azimuthal-rotational-symmetry axis 111 is non-collinear with first-opening rotational-symmetry axis 153. Second main-landing-gear assembly 112 is connected to at least one of second plurality of frame members 115. Second main-landing-gear assembly 112 is also pivotable relative to at least one of second plurality of frame members 115 and is selectively moveable between, inclusively, a retracted position and an extended position. When second main-landing-gear assembly 112 is in the retracted position, second main-landing-gear door 142 is in the closed position, and second-wheel azimuthal-rotational-symmetry axis 117 is collinear with second-opening symmetry axis 155. When second main-landing-gear assembly 112 is in the extended position, second main-landing-gear door 142 is in the open position, and second-wheel azimuthal-rotational-symmetry axis 117 is non-collinear with second-opening symmetry axis 155. The preceding content of this paragraph characterizes example 8 of the subject matter, disclosed herein, where example 8 also encompasses any one of examples 4 to 7, above.

Main-landing-gear system 104 includes only two wheels in the exemplary configuration, which reduces the weight of aircraft subassembly 100 compared to other similarly sized cargo aircraft and still accommodates a comparable take-off weight. That is, main-landing-gear system 104 allows the aircraft, based on aircraft subassembly 100, to carry a similar amount of cargo weight as other, larger aircraft that include larger landing gear assembly assemblies. As such, the aircraft, based on aircraft subassembly 100, described herein, has reduced operational costs because of requiring less fuel to transport a comparable amount of cargo.

Referring generally to FIGS. 1A, 1B, and 1C and particularly to, e.g., FIG. 5 for illustrative purposes only and not by way of limitation, sponson surface area SA2 does not include areas of first circumferentially closed opening 152 and second circumferentially closed opening 154. The preceding content of this paragraph characterizes example 9 of the subject matter, disclosed herein, where example 9 also encompasses example 8, above.

As used herein, the term "circumferentially closed" is used to describe any closed, rounded shape, such as, without limitation, a circle, an oval, an ellipse, etc. By forming first circumferentially closed opening 152 and second circumferentially closed opening 154 in sponson 130, less structural material is required to manufacture sponson 130 than if first main-landing-gear door 140 and second main-landing-gear door 142 were extended to cover first circumferentially closed opening 152 and second circumferentially closed opening 154, respectively. Less material simplifies manufacturing and also reduces the overall weight of aircraft subassembly 100.

Referring generally to FIGS. 1A, 1B, and 1C and particularly to, e.g., FIGS. 5, 8B, and 10B for illustrative purposes only and not by way of limitation, first circumferentially open cut-out 149 further comprises curvilinear boundary edge 144. At least a portion of curvilinear boundary edge 144 forms only a portion of first circumferentially closed opening 152. The preceding content of this paragraph characterizes example 10 of the subject matter, disclosed herein, where example 10 also encompasses example 9, above.

Curvilinear boundary edge 144 forms a portion of both first circumferentially open cut-out 149 and first circumferentially closed opening 152 such that at least a portion of first circumferentially open cut-out 149 overlaps with a portion of first circumferentially closed opening 152.

Referring generally to FIGS. 1A, 1B, and 1C and particularly to, e.g., FIGS. 5, 8B, and 10B for illustrative purposes only and not by way of limitation, first circumferentially open cut-out 149 further comprises first boundary edge 162, extending from curvilinear boundary edge 144. The preceding content of this paragraph characterizes example 11 of the subject matter, disclosed herein, where example 11 also encompasses example 10, above.

Referring generally to FIGS. 1A, 1B, and 1C and particularly to, e.g., FIGS. 5, 8B, and 10B for illustrative purposes only and not by way of limitation, first circumferentially open cut-out 149 further comprises second boundary edge 164, extending from curvilinear boundary edge 144. The preceding content of this paragraph characterizes example 12 of the subject matter, disclosed herein, where example 12 also encompasses example 11, above.

Referring generally to FIGS. 1A, 1B, and 1C and particularly to, e.g., FIGS. 5, 8B, and 10B for illustrative purposes only and not by way of limitation, curvilinear boundary edge 144 has curvilinear-boundary-edge first end 166 and curvilinear-boundary-edge second end 168 that is spaced away from curvilinear-boundary-edge first end 166. First boundary edge 162 extends from curvilinear-boundary-edge first end 166. The preceding content of this paragraph characterizes example 13 of the subject matter, disclosed herein, where example 13 also encompasses example 12, above.

First boundary edge 162, extending from curvilinear-boundary-edge first end 166, forms a vertex where first boundary edge 162 and curvilinear-boundary-edge first end 166 meet. Specifically, first boundary edge 162 and curvilinear-boundary-edge first end 166 form a male vertex or corner that avoids stress risers that are inherently formed in internal, or female, vertices or corners. Fewer or no stress risers reduces the fatigue of sponson 130 and can extend the service life of sponson 130.

Referring generally to FIGS. 1A, 1B, and 1C and particularly to, e.g., FIGS. 5, 8B, and 10B for illustrative purposes only and not by way of limitation, second boundary edge 164 extends from curvilinear-boundary-edge second end 168. The preceding content of this paragraph characterizes example 14 of the subject matter, disclosed herein, where example 14 also encompasses example 13, above.

Similar to first boundary edge 162 described above, second boundary edge 164 extending from curvilinear-boundary-edge second end 168 forms a vertex where second boundary edge 164 and curvilinear-boundary-edge second end 168. Specifically, second boundary edge 164 and curvilinear-boundary-edge second end 168 form a male vertex or corner that avoids stress risers that are inherently formed in internal, or female, vertices or corners. Fewer or no stress risers reduces the fatigue of sponson 130 and can extend the service life of sponson 130.

Referring generally to FIGS. 1A, 1B, and 1C and particularly to, e.g., FIGS. 5, 10A, and 10B for illustrative purposes only and not by way of limitation, first boundary edge 162 is parallel to second boundary edge 164. The preceding content of this paragraph characterizes example 15 of the subject matter, disclosed herein, where example 15 also encompasses example 14, above.

Orienting first boundary edge 162 parallel to second boundary edge 164 simplifies manufacturing of sponson 130 and adjacent first main-landing-gear door 140 and reduces manufacturing cost. Furthermore, first boundary edge 162 and second boundary edge 164, oriented parallel to each other, are spaced from each other a distance that is approximately equal to the diameter of first tire 160. Spacing first boundary edge 162 and second boundary edge 164 in such a way enables first main-landing-gear door 140 to have a width that is approximately equal to the diameter of first tire 160. First main-landing-gear door 140 sized in such a manner is lightweight to reduce the weight of aircraft subassembly 100.

Referring generally to FIGS. 1A, 1B, and 1C and particularly to, e.g., FIGS. 5 and 10B for illustrative purposes only and not by way of limitation, first boundary edge 162, second boundary edge 164, and curvilinear boundary edge 144 collectively form a contour. The contour comprises at least one curvilinear line or a combination of at least one straight line and at least one curvilinear line. The contour is also devoid of internal angles that have vertices. The preceding content of this paragraph characterizes example 16 of the subject matter, disclosed herein, where example 16 also encompasses example 15, above.

As used herein, the term "contour" is meant to describe a contour designed to minimize the effects of stress and that is devoid of internal angles having vertices. As used herein, the term "vertex" describes either an extreme local curvature or a point, where two curvilinear lines, two straight lines, or a curvilinear line and a straight line meet. As described herein, the contour, formed by first boundary edge 162, second boundary edge 164, and curvilinear boundary edge 144 forms two male vertices or corners, thus avoiding stress risers that are inherently formed in internal, or female, vertices or corners. Fewer or no stress risers reduces the fatigue of sponson 130 and can extend the service life of sponson 130.

Referring generally to FIGS. 1A, 1B, and 1C and particularly to, e.g., FIGS. 5 and 10B for illustrative purposes only and not by way of limitation, first boundary edge 162 and the second boundary edge 164 are linear. The preceding content of this paragraph characterizes example 17 of the subject matter, disclosed herein, where example 17 also encompasses any one of examples 12 to 16, above.

Linear first boundary edge 162 and second boundary edge 164 are easier and less costly to manufacture than nonlinear edges.

Referring generally to FIGS. 1A, 1B, and 1C and particularly to, e.g., FIGS. 5, 10A, and 10B for illustrative purposes only and not by way of limitation, first boundary edge 162, second boundary edge 164, and curvilinear boundary edge 144 collectively form a contour. The contour comprises at least one curvilinear line or a combination of at least one straight line and at least one curvilinear line. The contour is also devoid of internal angles that have vertices. The preceding content of this paragraph characterizes example 18 of the subject matter, disclosed herein, where example 18 also encompasses example 17, above.

As described herein, the contour formed by first boundary edge 162, second boundary edge 164, and curvilinear boundary edge 144 forms two male vertices or corners, thus avoiding stress risers that are inherently formed in internal, or female, vertices or corners. Fewer or no stress risers reduces the fatigue of sponson 130 and can extend the service life of sponson 130.

Referring generally to FIGS. 1A, 1B, and 1C and particularly to, e.g., FIG. 3 for illustrative purposes only and not by way of limitation, first main-landing-gear assembly 106 is selectively moveable between, inclusively, the retracted position and the extended position about first pivot axis 118. First pivot axis 118 is 65.0 inches to 75.0 inches away from virtual plane of symmetry 120. The preceding content of this paragraph characterizes example 19 of the subject matter, disclosed herein, where example 19 also encompasses example 18, above.

As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities may be defined. Positioning first pivot axis 118 the described distance from virtual plane of symmetry 120 allows for sufficient space for first main-landing-gear assembly 106 to rotate between inclusively, the retracted position and the extended position, but the described distance is not so large that first main-landing-gear assembly 106 occupies a greater than required amount of space within sponson 130.

Referring generally to FIGS. 1A, 1B, and 1C and particularly to, e.g., FIG. 3 for illustrative purposes only and not by way of limitation, first pivot axis 118 is 70.5 inches away from virtual plane of symmetry 120. The preceding content of this paragraph characterizes example 20 of the subject matter, disclosed herein, where example 20 also encompasses example 19, above.

As described herein, first pivot axis 118 is positioned as close to virtual plane of symmetry 120 as possible to allow for sufficient space for first main-landing-gear assembly 106 to move to the extended position, but also such that first main-landing-gear assembly 106 occupies the smallest possible volume to enable sponson 130 to be as small as possible.

Referring generally to FIGS. 1A, 1B, and 1C and particularly to, e.g., FIG. 3 for illustrative purposes only and not by way of limitation, first main-landing-gear assembly 106 and second main-landing-gear assembly 112 define wheelbase 124 between first-wheel mid-plane 113 and second-wheel mid-plane 119 when first main-landing-gear assembly 106 is in the extended position and second main-landing-gear assembly 112 is in the extended position. Wheelbase 124 has a length of 170 inches to 180 inches. The preceding content of this paragraph characterizes example 21 of the subject matter, disclosed herein, where example 21 also encompasses any one of examples 18 to 20, above.

As shown in the figures, first-wheel mid-plane 113 and second-wheel mid-plane 119 divide first wheel 110 and second wheel 116, respectively, into two equal portions. As used herein, the term "wheelbase" is used to describe the distance between first-wheel mid-plane 113 and second-wheel mid-plane 119, and is also be known as "track".

Wheelbase 124 described herein enables the aircraft, based on aircraft subassembly 100, to have improved maneuverability while taxiing.

Referring generally to FIGS. 1A, 1B, and 1C and particularly to, e.g., FIG. 3 for illustrative purposes only and not by way of limitation, the length of wheelbase 124 is 172 inches. The preceding content of this paragraph characterizes example 22 of the subject matter, disclosed herein, where example 22 also encompasses example 21, above.

As described herein, wheelbase 124 improves the maneuverability of the aircraft, based on aircraft subassembly 100, while taxiing.

Referring generally to FIGS. 1A, 1B, and 1C and particularly to, e.g., FIG. 4 for illustrative purposes only and not by way of limitation, when first main-landing-gear assembly 106 and second main-landing-gear assembly 112 are in the retracted position, shortest distance D1 between first wheel 110 and second wheel 116 is 12 inches to 20 inches. The preceding content of this paragraph characterizes example 23 of the subject matter, disclosed herein, where example 23 also encompasses any one of examples 18 to 22, above.

Positioning first wheel 110 nearby second wheel 116 occupies less space within sponson 130 and enables sponson 130 to be smaller than if first wheel 110 and second wheel 116 were positioned farther apart. In such a configuration, sponson 130 has a low drag coefficient on aircraft subassembly 100 as the aircraft, based on aircraft subassembly 100, flies through the air. Reducing the drag coefficient of sponson 130 enables an increased maximum speed and an increased fuel efficiency of the aircraft, based on aircraft subassembly 100. Furthermore, sponson 130 reduces the weight of aircraft subassembly 100 and further increases fuel efficiency of the associated aircraft.

Referring generally to FIGS. 1A, 1B, and 1C and particularly to, e.g., FIG. 4 for illustrative purposes only and not by way of limitation, when first main-landing-gear assembly 106 and second main-landing-gear assembly 112 are in the retracted position, shortest distance D1 between first wheel 110 and second wheel 116 is 16.1 inches. The preceding content of this paragraph characterizes example 24 of the subject matter, disclosed herein, where example 24 also encompasses example 23, above.

As described herein, the closer first wheel 110 is positioned proximate second wheel 116, the smaller sponson 130 can be. In such a configuration, sponson 130 has a low drag coefficient on aircraft subassembly 100. Further reducing the drag coefficient of sponson 130 enables an increased maximum speed and an increased fuel efficiency of the aircraft, based on aircraft subassembly 100. Moreover, sponson 130 of example 24 further reduces the weight of aircraft subassembly 100 and further increases fuel efficiency of the associated aircraft.

Referring generally to FIGS. 1A, 1B, and 1C and particularly to, e.g., FIGS. 5 and 10A for illustrative purposes only and not by way of limitation, First wheel 110 comprises first tire 160, having a diameter. When first main-landing-gear assembly 106 is in the retracted position, and first main-landing-gear door 140 is in the closed position, first circumferentially closed opening 152 has a first diameter that is 1% to 5% greater than the diameter of first tire 160. The preceding content of this paragraph characterizes example 25 of the subject matter, disclosed herein, where example 25 also encompasses any one of examples 18 to 24, above.

As described herein, first circumferentially closed opening 152 is circular to correspond to the shape of first tire 160 when first main-landing-gear assembly 106 is in the retracted position. Because first tire 160 is exposed during flight, the closer in size and shape first circumferentially closed opening 152 is to first tire 160, the less drag is caused by first circumferentially closed opening 152. In such a configuration, first tire 160 occupies much of the area of first circumferentially closed opening 152 and itself acts as part of sponson 130, which reduces the drag coefficient of sponson 130. Reducing the drag coefficient of sponson 130 enables an increased maximum speed and an increased fuel efficiency of the aircraft, based on aircraft subassembly 100.

Figure 13:
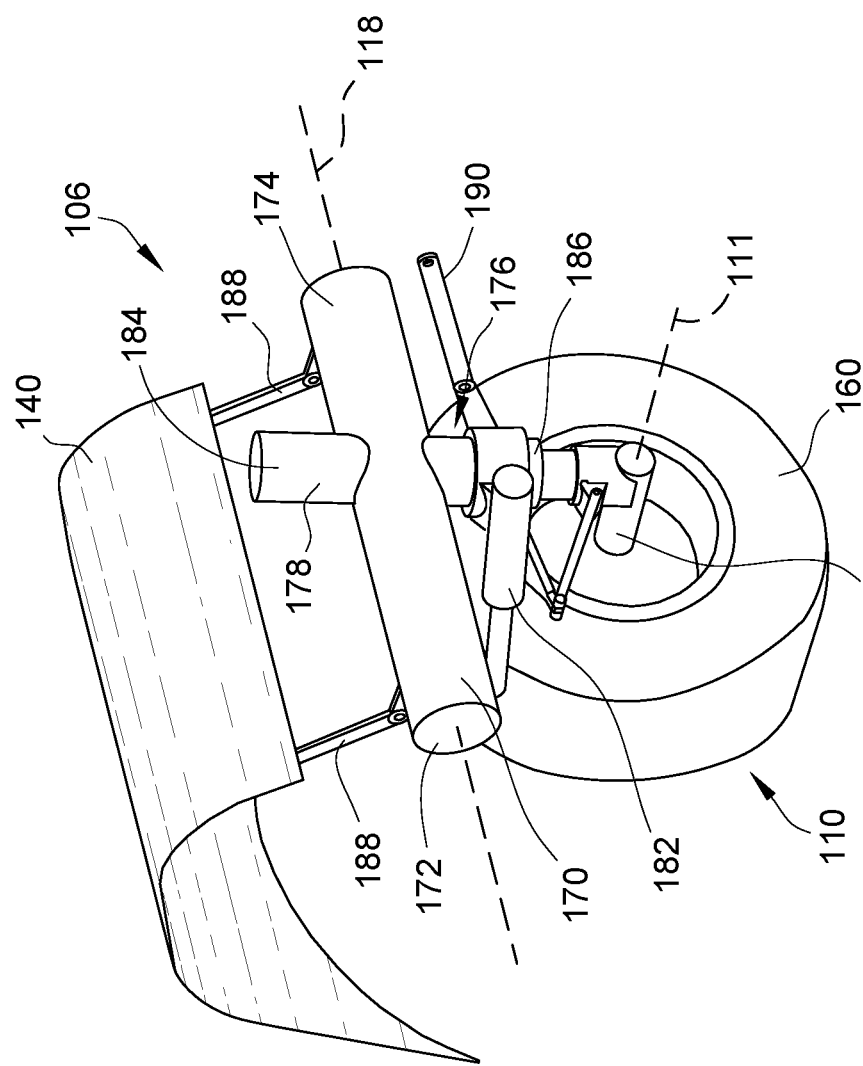
FIG. 13 is a schematic, perspective view of the main-landing-gear assembly in the retracted position and in the extended position, according to one or more examples of the subject matter, disclosed herein.
Figure 14:
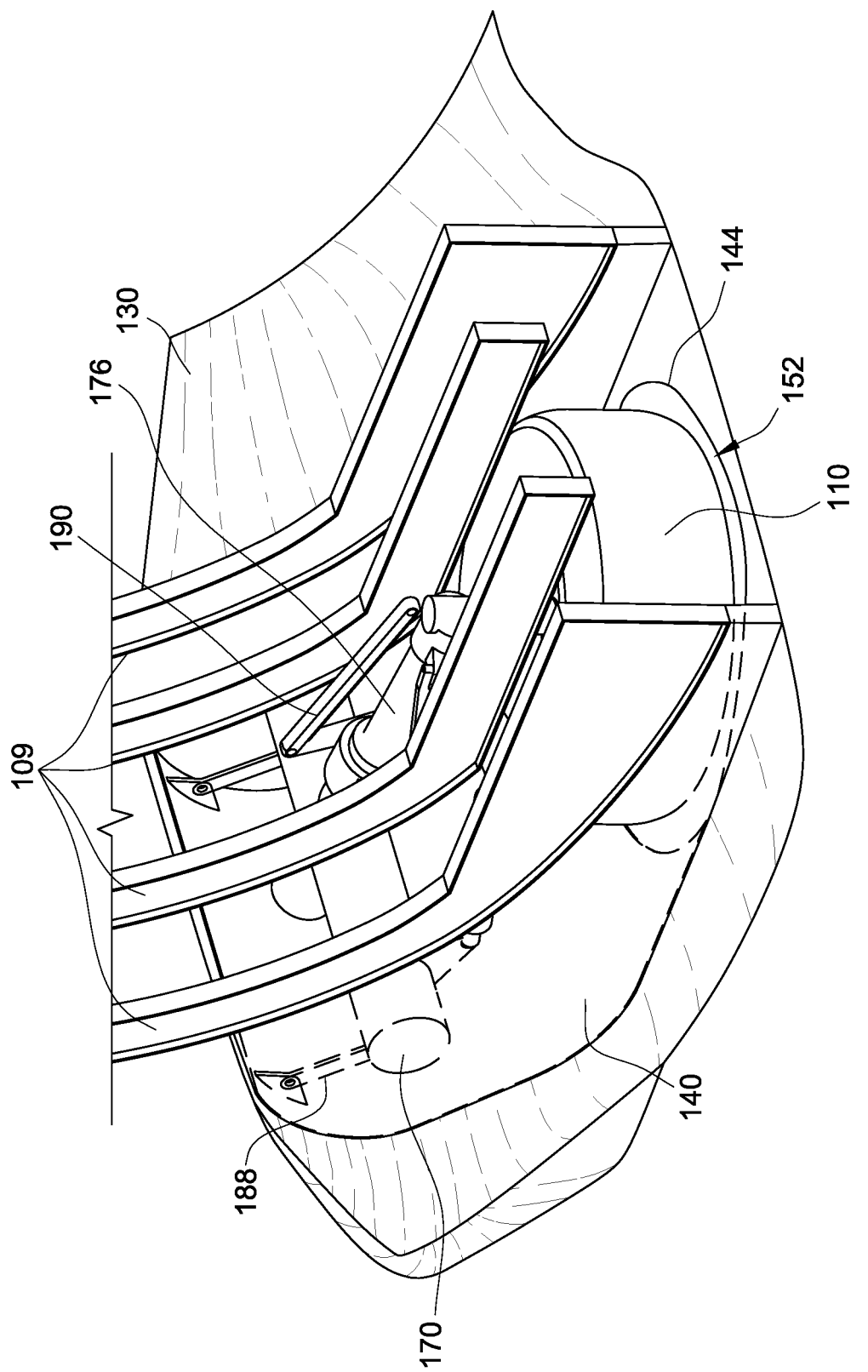
FIG. 14 is a schematic, perspective view of the main-landing-gear assembly, fuselage structure, and sponson, according to one or more examples of the subject matter, disclosed herein.
Figure 15:
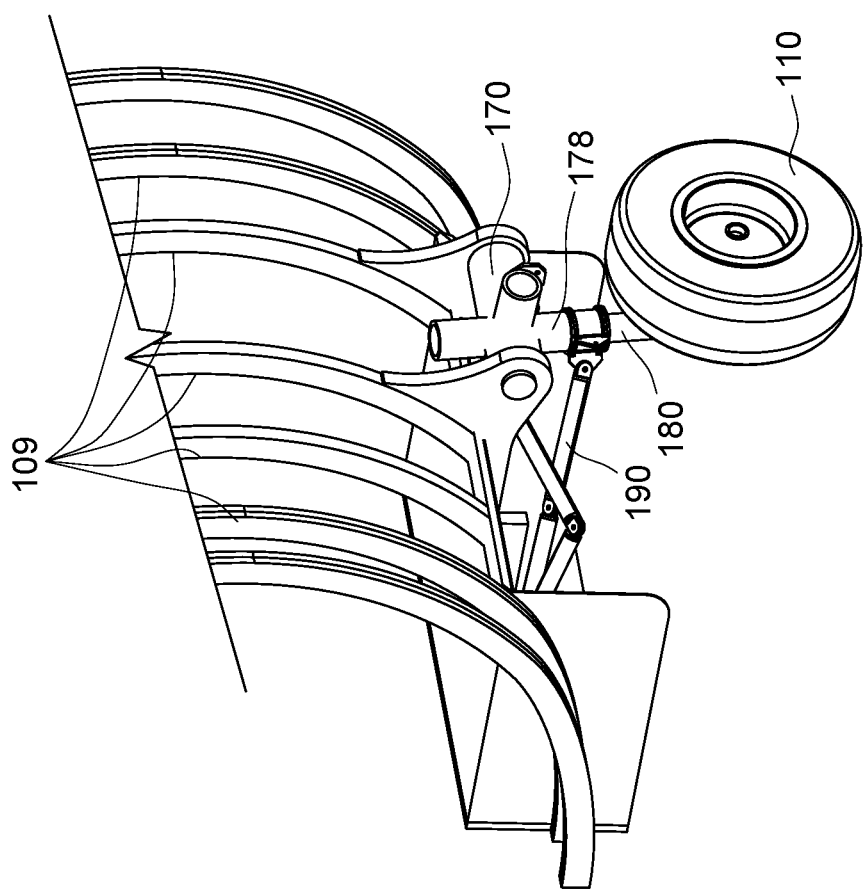
FIG. 15 is a schematic, perspective view of the main-landing-gear assembly and fuselage structure, according to one or more examples of the subject matter, disclosed herein.

Referring generally to FIGS. 1A, 1B, and 1C and particularly to, e.g., FIG. 13 for illustrative purposes only and not by way of limitation, first main-landing-gear assembly 106 comprises main trunnion brace 170, comprising main-trunnion-brace first end 172 and main-trunnion-brace second end 174. First main-landing-gear assembly 106 further comprises oleo strut 176, comprising outer cylinder 178, coupled to main trunnion brace 170 between main-trunnion-brace first end 172 and main-trunnion-brace second end 174. Oleo strut 176 also comprises inner cylinder 180, which is telescopically moveable with respect to outer cylinder 178. First main-landing-gear assembly 106 additionally comprises axle 181, coupled between inner cylinder 180 and first wheel 110, and actuator 182, coupled to main trunnion brace 170 and to fuselage structure 102. Actuator 182 is configured to move first main-landing-gear assembly 106 between, inclusively, the retracted position and the extended position about first pivot axis 118, which extends through main trunnion brace 170 from main-trunnion-brace first end 172 and main-trunnion-brace second end 174. The preceding content of this paragraph characterizes example 26 of the subject matter, disclosed herein, where example 26 also encompasses any one of examples 18 to 25, above.

Positioning outer cylinder 178 between main-trunnion-brace first end 172 and main-trunnion-brace second end 174 enables even distribution of landing forces to main-trunnion-brace first end 172 and main-trunnion-brace second end 174. Evenly distributing these forces leads to less part fatigue and extends the service life of at least main trunnion brace 170 and oleo strut 176.

Referring generally to FIGS. 1A, 1B, and 1C and particularly to, e.g., FIG. 13 for illustrative purposes only and not by way of limitation, outer cylinder 178 has outer-cylinder first end 184 and outer-cylinder second end 186, and main trunnion brace 170 is positioned between outer-cylinder first end 184 and outer-cylinder second end 186. The preceding content of this paragraph characterizes example 27 of the subject matter, disclosed herein, where example 27 also encompasses example 26, above.

Positioning main trunnion brace 170 between outer-cylinder first end 184 and outer-cylinder second end 186, rather than at a top end of outer cylinder 178 reduces the height of first main-landing-gear assembly 106 when first main-landing-gear assembly 106 is in the deployed position. Reducing the height of first main-landing-gear assembly 106 enables sponson 130 to have a relatively small size, which reduces the overall weight and drag coefficient of sponson 130 and increases the fuel efficiency of the aircraft, based on aircraft subassembly 100. Furthermore, reducing the height of first main-landing-gear assembly 106 enables gear-bay portion 158 to have a smaller size, which increases the size of cargo-bay portion 156, enabling the aircraft, based on aircraft subassembly 100, to carry a greater volume of cargo for increased operational efficiency.

Referring generally to FIGS. 1A, 1B, and 1C and particularly to, e.g., FIG. 13 for illustrative purposes only and not by way of limitation, oleo strut 176 is oblique relative to first pivot axis 118. The preceding content of this paragraph characterizes example 28 of the subject matter, disclosed herein, where example 28 also encompasses example 26, above.

The angled orientation of oleo strut 176 relative to first pivot axis 118 allows for even distribution of landing forces among at least oleo strut 176, main trunnion brace 170, and first plurality of frame members 109. Evenly distributing these forces leads to less part fatigue and extends the service life of first main-landing-gear assembly 106 and fuselage structure 102.

Referring generally to FIGS. 1A, 1B, and 1C and particularly to, e.g., FIG. 13 for illustrative purposes only and not by way of limitation, first main-landing-gear assembly 106 further comprises pair of deployment links 188, coupled between first main-landing-gear door 140 and main trunnion brace 170. The preceding content of this paragraph characterizes example 29 of the subject matter, disclosed herein, where example 29 also encompasses any one of examples 26 to 28, above.

Coupling deployment links 188 to main trunnion brace 170 enables moving deployment links 188 in synch with main trunnion brace 170 and requires only a single actuator, such as actuator 182, to both extend first main-landing-gear assembly 106 and open first main-landing-gear door 140. As actuator 182 extends, main trunnion brace 170 rotates about first pivot axis 118 and deployment links 188 rotate with the outer surface of main trunnion brace 170 to move first main-landing-gear door 140 into the open position.

Referring generally to FIGS. 1A, 1B, and 1C and particularly to, e.g., FIG. 13 for illustrative purposes only and not by way of limitation, first main-landing-gear assembly 106 further comprises side brace 190, coupled between outer cylinder 178 and fuselage structure 102. The preceding content of this paragraph characterizes example 30 of the subject matter, disclosed herein, where example 30 also encompasses any one of examples 26 to 29, above.

Side brace 190 further enables even distribution of landing forces from first main-landing-gear assembly 106 to fuselage structure 102. As described herein, evenly distributing these forces leads to less part fatigue and extends the service life of first main-landing-gear assembly 106 and fuselage structure 102.

Figure 2:
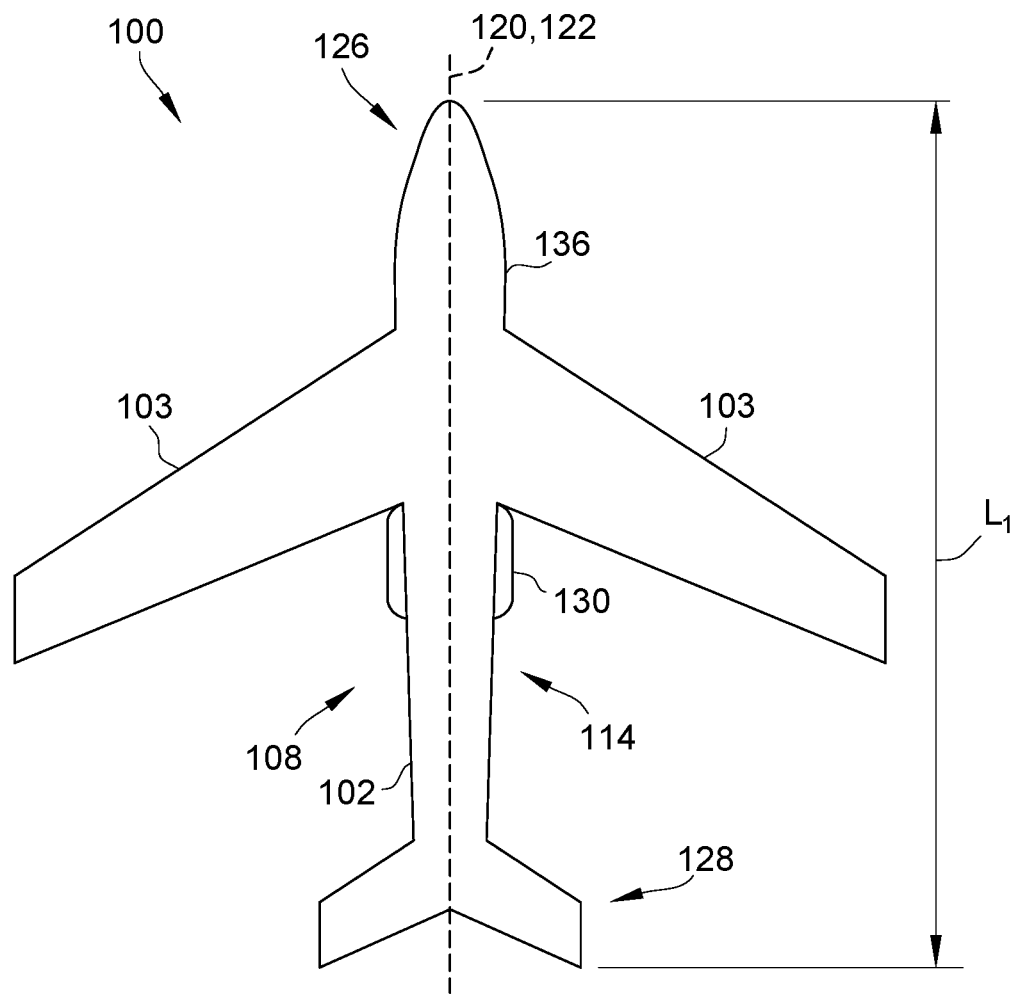
FIG. 2 is a schematic, elevation view of the aircraft subassembly of FIGS. 1A, 1B, and 1C, according to one or more examples of the subject matter, disclosed herein.

Referring generally to FIGS. 1A, 1B, and 1C and particularly to, e.g., FIGS. 2 and 5 for illustrative purposes only and not by way of limitation, fuselage structure 102 has fuselage-structure longitudinal axis 122, first fuselage-structure end 126, second fuselage-structure end 128, and fuselage-structure length L1, extending from first fuselage-structure end 126 to second fuselage-structure end 128 along fuselage-structure longitudinal axis 122. Pair of wings 103 is located between first fuselage-structure end 126 and second fuselage-structure end 128. Sponson 130 has sponson forward side 132, sponson aft side 134, and sponson length L2, extending from sponson forward side 132 to sponson aft side 134 along fuselage-structure longitudinal axis 122. Sponson length L2 is 10% to 15% of fuselage-structure length L1. The preceding content of this paragraph characterizes example 31 of the subject matter, disclosed herein, where example 31 also encompasses any one of examples 1 to 30, above.

The relatively small sponson length L2 to fuselage length L1 ratio is associated with sponson 130 that has a relatively small size. In such a configuration, sponson 130 has a low drag coefficient on aircraft subassembly 100 as the aircraft, based on aircraft subassembly 100, flies through the air. Reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100. Furthermore, the ratio of sponson length L2 to fuselage length L1, described herein, enable sponson 130 to be as small as possible, which reduces the weight of sponson 130 and further increases fuel efficiency of the aircraft, based on aircraft subassembly 100.

Referring generally to FIGS. 1A, 1B, and 1C and particularly to, e.g., FIGS. 2 and 5 for illustrative purposes only and not by way of limitation, sponson length L2 is 11.5% to 13.5% of fuselage-structure length L1. The preceding content of this paragraph characterizes example 32 of the subject matter, disclosed herein, where example 32 also encompasses example 31, above.

As described herein, a small sponson length L2 to fuselage length L1 ratio is associated with a relatively low drag coefficient of sponson 130. Further reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100.

Referring generally to FIGS. 1A, 1B, and 1C and particularly to, e.g., FIGS. 2 and 5 for illustrative purposes only and not by way of limitation, sponson length L2 is 12.0% to 13.0% of fuselage-structure length L1. The preceding content of this paragraph characterizes example 33 of the subject matter, disclosed herein, where example 33 also encompasses example 32, above.

As described herein, a small sponson length L2 to fuselage length L1 ratio is associated with the relatively low drag coefficient of sponson 130. Further reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100.

Referring generally to FIGS. 1A, 1B, and 1C and particularly to, e.g., FIGS. 2 and 5 for illustrative purposes only and not by way of limitation, sponson length L2 is 12.4% of fuselage-structure length L1. The preceding content of this paragraph characterizes example 34 of the subject matter, disclosed herein, where example 34 also encompasses example 33, above.

As described herein, a small sponson length L2 to fuselage length L1 ratio is associated with the relatively low drag coefficient of sponson 130. Further reducing the drag coefficient of sponson 130 improves the performance of aircraft subassembly 100 as it pertains to speed and fuel efficiency of the associated aircraft. Specifically, a low drag coefficient enables an increased maximum speed and an increased fuel efficiency of the aircraft, based on aircraft subassembly 100.

Figure 7:
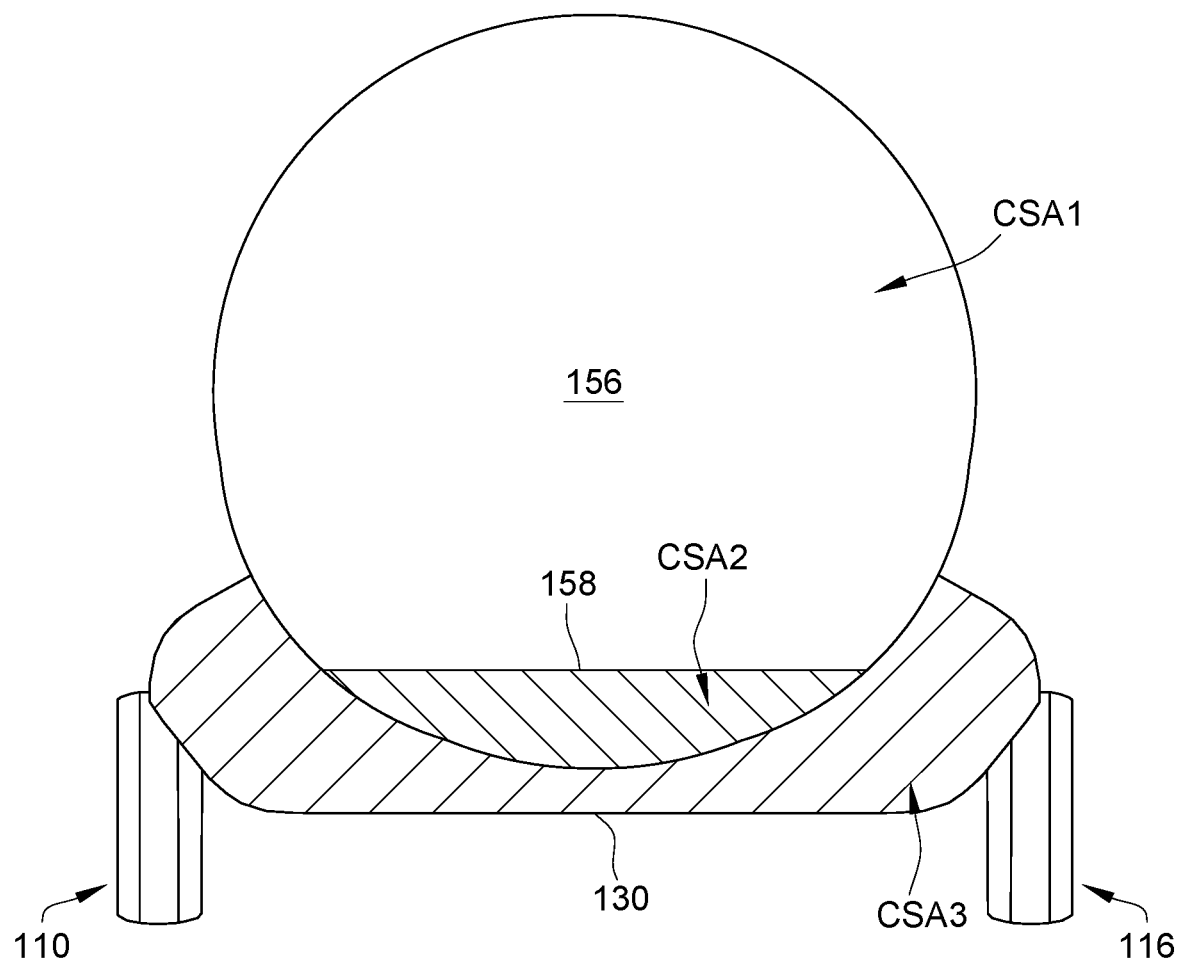
FIG. 7 is a schematic, sectional view of the aircraft subassembly of FIGS. 1A, 1B, and 1C, according to one or more examples of the subject matter, disclosed herein.
Figure 9A:
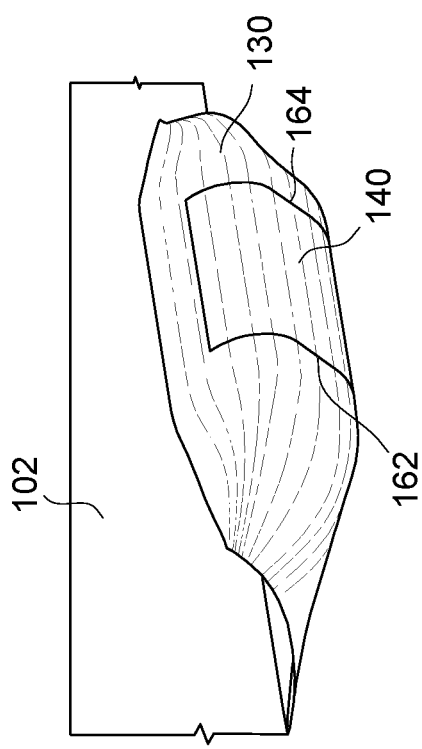
FIGS. 9A and 9B are schematic, perspective views of the sponson of FIG. 5, illustrating the main-landing-gear assembly in the retracted position and in the extended position, according to one or more examples of the subject matter, disclosed herein.
Figure 9B:
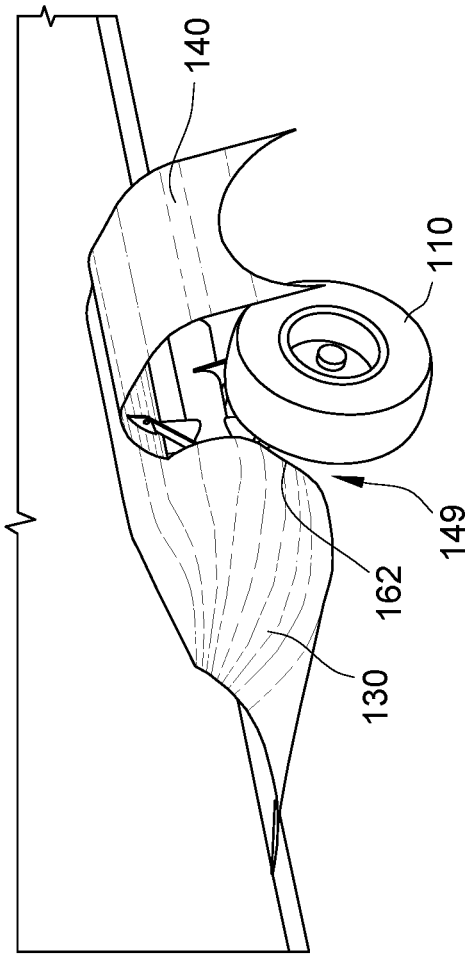

Referring generally to FIGS. 1A, 1B, and 1C and particularly to, e.g., FIG. 7 for illustrative purposes only and not by way of limitation, fuselage structure 102 further comprises cargo-bay portion 156, having cargo-bay-portion cross-sectional area CSA1, and gear-bay portion 158, having gear-bay-portion cross-sectional area CSA2. Cargo-bay portion 156 and gear-bay portion 158 are separated by cargo-bay floor 157. Sponson 130 has sponson cross-sectional area CSA3. Sponson cross-sectional area CSA3, cargo-bay-portion cross-sectional area CSA1, and gear-bay-portion cross-sectional area CSA2 collectively form aircraft cross-sectional area CSA4. Sponson cross-sectional area CSA3 is 25% to 35% of aircraft cross-sectional area CSA4. The preceding content of this paragraph characterizes example 35 of the subject matter, disclosed herein, where example 35 also encompasses any one of examples 1 to 34, above.

The relatively small ratio of sponson cross-sectional area CSA3 to aircraft cross-sectional area CSA4 is associated with sponson 130 that has a relatively small size. In such a configuration, sponson 130 has a low drag coefficient on aircraft subassembly 100 as the aircraft, based on aircraft subassembly 100, flies through the air. Reducing the drag coefficient of sponson 130 enables an increased maximum speed and an increased fuel efficiency of the aircraft, based on aircraft subassembly 100. Furthermore, the ratio of sponson cross-sectional area CSA3 to aircraft cross-sectional area CSA4, described herein, increases the size of cargo-bay portion 156, which enables aircraft subassembly 100 to carry a greater volume of cargo for increased operational efficiency of the associated aircraft.

Referring generally to FIGS. 1A, 1B, and 1C and particularly to, e.g., FIG. 7 for illustrative purposes only and not by way of limitation, sponson cross-sectional area CSA3 is 27.5% to 32.5% of aircraft cross-sectional area CSA4. The preceding content of this paragraph characterizes example 36 of the subject matter, disclosed herein, where example 36 also encompasses example 35, above.

As described herein, the low ratio of sponson cross-sectional area CSA3 to aircraft cross-sectional area CSA4 is associated with a relatively low drag coefficient of sponson 130. Further reducing the drag coefficient of sponson 130 enables an increased maximum speed and an increased fuel efficiency of the aircraft, based on aircraft subassembly 100. Moreover, reducing the ratio of sponson cross-sectional area CSA3 to aircraft cross-sectional area CSA4 further increases the size of cargo-bay portion 156, which enables aircraft subassembly 100 to carry a greater volume of cargo for increased operational efficiency of the associated aircraft.

Referring generally to FIGS. 1A, 1B, and 1C and particularly to, e.g., FIG. 7 for illustrative purposes only and not by way of limitation, sponson cross-sectional area CSA3 is 29.4% of aircraft cross-sectional area CSA4. The preceding content of this paragraph characterizes example 37 of the subject matter, disclosed herein, where example 37 also encompasses example 36, above.

As described herein, the low ratio of sponson cross-sectional area CSA3 to aircraft cross-sectional area CSA4 is associated with the relatively low drag coefficient of sponson 130. Further reducing the drag coefficient of sponson 130 enables an increased maximum speed and an increased fuel efficiency of the aircraft, based on aircraft subassembly 100. Moreover, reducing the ratio of sponson cross-sectional area CSA3 to aircraft cross-sectional area CSA4 further increases the size of cargo-bay portion 156, which enables aircraft subassembly 100 to carry a greater volume of cargo for increased operational efficiency of the associated aircraft.

Referring generally to FIGS. 1A, 1B, and 1C and particularly to, e.g., FIG. 7 for illustrative purposes only and not by way of limitation, cargo-bay-portion cross-sectional area CSA1 is double sponson cross-sectional area CSA3. The preceding content of this paragraph characterizes example 38 of the subject matter, disclosed herein, where example 38 also encompasses any one of examples 35 to 37, above.

The larger cargo-bay-portion cross-sectional area CSA1 is relative to sponson cross-sectional area CSA3, the greater is the cargo volume of aircraft subassembly 100.

Referring generally to FIGS. 1A, 1B, and 1C and particularly to, e.g., FIG. 7 for illustrative purposes only and not by way of limitation, cargo-bay-portion cross-sectional area CSA1 is 60% to 65% of aircraft cross-sectional area CSA4. The preceding content of this paragraph characterizes example 39 of the subject matter, disclosed herein, where example 39 also encompasses any one of examples 35 to 38, above.

A high cargo-bay-portion cross-sectional area CSA1 to aircraft cross-sectional area CSA4 ratio enables a larger cargo bay volume for aircraft subassembly 100, which enables the aircraft, based on aircraft subassembly 100, to carry a greater volume of cargo for increased operational efficiency of the associated aircraft.

Referring generally to FIGS. 1A, 1B, and 1C and particularly to, e.g., FIG. 7 for illustrative purposes only and not by way of limitation, cargo-bay-portion cross-sectional area CSA1 is 62.2% of aircraft cross-sectional area CSA4. The preceding content of this paragraph characterizes example 40 of the subject matter, disclosed herein, where example 40 also encompasses example 39, above.

As described herein, a high ratio of cargo-bay-portion cross-sectional area CSA1 to aircraft cross-sectional area CSA4 is associated with a larger cargo bay volume for the aircraft, based on aircraft subassembly 100. Further reducing the ratio enables aircraft subassembly 100 to carry a greater volume of cargo for increased operational efficiency of the associated aircraft.

Referring generally to FIGS. 1A, 1B, and 1C and particularly to, e.g., FIG. 7 for illustrative purposes only and not by way of limitation, gear-bay-portion cross-sectional area CSA2 is 5.0% to 10.0% of aircraft cross-sectional area CSA4. The preceding content of this paragraph characterizes example 41 of the subject matter, disclosed herein, where example 41 also encompasses any one of examples 35 to 40, above.

The gear-bay-portion cross-sectional area CSA2 to aircraft cross-sectional area CSA4 ratio is representative of how much of aircraft cross-sectional area CSA4 is occupied by gear-bay portion 158. A low ratio describes gear-bay portion 158 of a smaller size, which is associated with a relatively large cargo-bay portion 156. As described herein, the larger is cargo-bay portion 156, the greater is the cargo volume of the aircraft, based on aircraft subassembly 100. Furthermore, positioning gear-bay portion 158 beneath cargo-bay floor 157 further reduces gear-bay-portion cross-sectional area CSA2 and increases cargo-bay-portion cross-sectional area CSA1.

Referring generally to FIGS. 1A, 1B, and 1C and particularly to, e.g., FIG. 7 for illustrative purposes only and not by way of limitation, gear-bay-portion cross-sectional area CSA2 is 8.4% of aircraft cross-sectional area CSA4. The preceding content of this paragraph characterizes example 42 of the subject matter, disclosed herein, where example 42 also encompasses example 41, above.

As described herein, the low ratio of gear-bay-portion cross-sectional area CSA2 to aircraft cross-sectional area CSA4 is associated with gear-bay portion 158 having a smaller size, which corresponds to cargo-bay portion 156 that has a relatively large size. Moreover, positioning gear-bay portion 158 beneath cargo-bay floor 157 further reduces gear-bay-portion cross-sectional area CSA2 and increases cargo-bay-portion cross-sectional area CSA1. As described herein, the larger the cargo-bay portion 156, the greater the cargo volume of aircraft subassembly 100.

Examples of the subject matter, disclosed herein may be described in the context of aircraft manufacturing and service method 1100 as shown in FIG. 16 and aircraft 1102 as shown in FIG. 17. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 17, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples, set forth herein, will come to mind to one skilled in the art, to which the present disclosure pertains, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An aircraft subassembly that comprises a fuselage structure, comprising a first side, which comprises a first plurality of frame members, and a second side, which comprises a second plurality of frame members, the aircraft subassembly further comprising a pair of wings, attached to the fuselage structure, and a main-landing-gear system, having a single pair of wheels, consisting of a first wheel, having a first-wheel azimuthal-rotational-symmetry axis and a first-wheel mid-plane, perpendicular to the first-wheel azimuthal-rotational-symmetry axis, and a second wheel, having a second-wheel azimuthal-rotational-symmetry axis and a second-wheel mid-plane, perpendicular to the second-wheel azimuthal-rotational-symmetry axis, the main-landing-gear system additionally comprising:
  a sponson, connected to and extending outward from the fuselage structure and comprising:
    a central portion;
    a first main-landing-gear door, moveable relative to the central portion between, inclusively, a closed position and an open position; and
    a second main-landing-gear door, moveable relative to the central portion between, inclusively, a closed position and an open position;
  a first main-landing-gear assembly, connected to the first wheel; and
  a second main-landing-gear assembly, connected to the second wheel,
  wherein
    the fuselage structure further comprises:
      a cargo-bay portion, having a cargo-bay-portion cross-sectional area (CSA1); and
      a gear-bay portion, having a gear-bay-portion cross-sectional area (CSA2);
    the cargo-bay portion and the gear-bay portion are separated by a cargo-bay floor;
    the sponson has a sponson cross-sectional area (CSA3);
    the sponson cross-sectional area (CSA3), the cargo-bay-portion cross-sectional area (CSA1), and the gear-bay-portion cross-sectional area (CSA2) collectively form an aircraft cross-sectional area (CSA4); and
    the sponson cross-sectional area (CSA3) is 27.5% to 32.5% of the aircraft cross-sectional area (CSA4).

2. The aircraft subassembly according to claim 1, further comprising a virtual plane of symmetry, equidistant from the first side of the fuselage structure and from the second side of the fuselage structure, and wherein:
  the central portion of the sponson comprises:
    a first circumferentially open cut-out; and
    a second circumferentially open cut-out; and
  the virtual plane of symmetry passes between the first circumferentially open cut-out and the second circumferentially open cut-out.

3. The aircraft subassembly according to claim 2, wherein the first circumferentially open cut-out is non-circular.

4. The aircraft subassembly according to claim 3, wherein:
the fuselage structure has a fuselage exterior surface, having a fuselage surface area (SAI);
the sponson has a sponson exterior surface, having a sponson surface area (SA2); and
the sponson surface area (SA2) is 10% to 15% of the fuselage surface area (SAI).

5. The aircraft subassembly according to claim 4, wherein:
the first main-landing-gear door has a first-main-landing-gear-door surface area (SA3);
the second main-landing-gear door has a second-main-landing-gear-door surface area (SA4); and
the first-main-landing-gear-door surface area (SA3) and the second-main-landing-gear-door surface area (SA4) form a portion of the sponson surface area (SA2).

6. The aircraft subassembly according to claim 4, wherein:
the first main-landing-gear door and the central portion of the sponson collectively form a first circumferentially closed opening when the first main-landing-gear door is in the closed position;
the first circumferentially closed opening has a first-opening rotational-symmetry axis that is perpendicular to a virtual plane, in which a projection of the first circumferentially closed opening has a maximum area;
the second main-landing-gear door and the central portion of the sponson collectively form a second circumferentially closed opening when the second main-landing-gear door is in the closed position;
the second circumferentially closed opening is circumferentially closed and has a second-opening symmetry axis that is perpendicular to a virtual plane, in which a projection of the second circumferentially closed opening has a maximum area;
the first main-landing-gear assembly is connected to at least one of the first plurality of frame members, is pivotable relative to at least the one of the first plurality of frame members, and is selectively moveable between, inclusively, a retracted position and an extended position;
when the first main-landing-gear assembly is in the retracted position, the first main-landing-gear door is in the closed position, and the first-wheel azimuthal-rotational-symmetry axis is collinear with the first-opening rotational-symmetry axis;
when the first main-landing-gear assembly is in the extended position, the first main-landing-gear door is in the open position, and the first-wheel azimuthal-rotational-symmetry axis (III) is non-collinear with the first-opening rotational-symmetry axis;
the second main-landing-gear assembly is connected to at least one of the second plurality of frame members, is pivotable relative to at least the one of the second plurality of frame members, and is selectively moveable between, inclusively, a retracted position and an extended position;
when the second main-landing-gear assembly is in the retracted position, the second main-landing-gear door is in the closed position, and the second-wheel azimuthal-rotational-symmetry axis is collinear with the second-opening symmetry axis; and
when the second main-landing-gear assembly is in the extended position, the second main-landing-gear door is in the open position, and the second-wheel azimuthal-rotational-symmetry axis is non-collinear with the second-opening symmetry axis.

7. The aircraft subassembly according to claim 6, wherein the sponsor surface area (SA2) does not include areas of the first circumferentially closed opening and the second circumferentially closed opening.

8. The aircraft subassembly according to claim 7, wherein the first circumferentially open cut-out further comprises a curvilinear boundary edge, at least a portion of which forms only a portion of the first circumferentially closed opening.

9. The aircraft subassembly according to claim 8, wherein the first circumferentially open cut-out further comprises a first boundary edge, extending from the curvilinear boundary edge.

10. The aircraft subassembly according to claim 9, wherein the first circumferentially open cut-out further comprises a second boundary edge, extending from the curvilinear boundary edge.

11. The aircraft subassembly according to claim 10, wherein:
the curvilinear boundary edge has a curvilinear-boundary-edge first end and a curvilinear-boundary-edge second end, spaced away from the curvilinear-boundary-edge first end; and
the first boundary edge extends from the curvilinear-boundary-edge first end.

12. The aircraft subassembly according to claim 11, wherein the second boundary edge extends from the curvilinear-boundary-edge second end.

13. The aircraft subassembly according to claim 12, wherein the first boundary edge is parallel to the second boundary edge.

14. The aircraft subassembly according to claim 13, wherein the first boundary edge, the second boundary edge, and the curvilinear boundary edge collectively form a contour, comprising at least one curvilinear line or a combination of at least one straight line and at least one curvilinear line, and devoid of internal angles, having vertices.

15. The aircraft subassembly according to claim 10, wherein the first boundary edge and the second boundary edge are linear.

16. The aircraft subassembly according to claim 15, wherein the first boundary edge, the second boundary edge, and the curvilinear boundary edge collectively form a contour, comprising at least one curvilinear line or a combination of at least one straight line and at least one curvilinear line, and devoid of internal angles, having vertices.

17. The aircraft subassembly according to claim 16, wherein:
the first wheel comprises a first tire, having a diameter; and
when the first main-landing-gear assembly is in the retracted position and the first main-landing-gear door is in the closed position, the first circumferentially closed opening has a first diameter that is 1% to 5% greater than the diameter of the first tire.

18. The aircraft subassembly according claim 16, wherein:
the first main-landing-gear assembly comprises:
a main trunnion brace, comprising a main-trunnion-brace first end and a main-trunnion-brace second end;
an oleo strut, comprising:
an outer cylinder, coupled to the main trunnion brace between the main-trunnion-brace first end and the main-trunnion-brace second end; and an inner cylinder, which is telescopically moveable with respect to the outer cylinder;

an axle, coupled between the inner cylinder and the first wheel; and an actuator, coupled to the main trunnion brace and to the fuselage structure, and the actuator is configured to move the first main-landing-gear assembly between, inclusively, the retracted position and the extended position about a first pivot axis, which extends through the main trunnion brace from the main-trunnion-brace first end and the main-trunnion-brace second end.

19. The aircraft subassembly according to claim 1, wherein:

the fuselage structure has a fuselage-structure longitudinal axis, a first fuselage-structure end, a second fuselage-structure end, and a fuselage-structure length (L1), extending from the first fuselage-structure end to the second fuselage-structure end along the fuselage-structure longitudinal axis;

the pair of wings is located between the first fuselage-structure end and the second fuselage-structure end;

the sponson has a sponson forward side, a sponson aft side, and a sponson length (L2), extending from the sponson forward side to the sponson aft side along the fuselage-structure longitudinal axis; and the sponson length (L2) is 10% to 15% of the fuselage-structure length (L1).

20. The aircraft subassembly according to claim 19, wherein the sponsors length (L2) is 11.5% to 13.5% of the fuselage-structure length (L1).

\* \* \* \* \*